United States Patent
Hamabe et al.

(10) Patent No.: US 9,942,882 B2
(45) Date of Patent: Apr. 10, 2018

(54) WIRELESS COMMUNICATION SYSTEM, WIRELESS COMMUNICATION METHOD, BASE STATION, MOBILE STATION, BASE STATION CONTROL METHOD, MOBILE STATION CONTROL METHOD, AND CONTROL PROGRAM

(71) Applicants: Kojiro Hamabe, Minato-ku (JP); Motoki Morita, Minato-ku (JP)

(72) Inventors: Kojiro Hamabe, Minato-ku (JP); Motoki Morita, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/230,579

(22) Filed: Mar. 31, 2014

(65) Prior Publication Data

US 2014/0213272 A1 Jul. 31, 2014

Related U.S. Application Data

(63) Continuation of application No. 12/681,063, filed as application No. PCT/JP2008/066629 on Sep. 16, 2008, now Pat. No. 8,731,576.

(30) Foreign Application Priority Data

Oct. 1, 2007 (JP) ................................. 2007-257709

(51) Int. Cl.
H04W 72/00 (2009.01)
H04W 72/04 (2009.01)
(Continued)

(52) U.S. Cl.
CPC ......... *H04W 72/04* (2013.01); *H04W 72/085* (2013.01); *H04W 24/10* (2013.01); *H04W 48/20* (2013.01); *H04W 72/06* (2013.01)

(58) Field of Classification Search
CPC ..... H04W 16/04; H04W 16/10; H04W 72/00; H04W 72/08
(Continued)

(56) References Cited

U.S. PATENT DOCUMENTS

| 5,956,642 A | 9/1999 | Larsson et al. |
|---|---|---|
| 6,055,432 A | 4/2000 | Haleem et al. |

(Continued)

FOREIGN PATENT DOCUMENTS

| CN | 1201356 A | 12/1998 |
|---|---|---|
| CN | 1256058 A | 6/2000 |

(Continued)

OTHER PUBLICATIONS

3GPP TS 25.214 V7 3.0, 3rd Generation Partnership Project; Technical Specification Group Radio Access Network; Physical layer procedures (FDD) (Release 7) Dec. 2006.
(Continued)

*Primary Examiner* — Amancio Gonzalez
(74) *Attorney, Agent, or Firm* — Sughrue Mion, PLLC

(57) ABSTRACT

To alleviate interference by a transmission signal on the uplink and downlink of a femto base station to a transmission signal on the uplink and downlink of a macro base station and/or a micro base station. A mobile station 9-2 and a femto base station 5-1 located within a macrocell 6 and a microcell 7 receive the HCS priority level of the macrocell 6 and the microcell 7 from a macro base station 3 or a micro base station 4. The mobile station 9-2 selects the microcell 7 having a higher HCS priority level, and performs communication by using a radio frequency RF3. Meanwhile, the femto base station 5-1 communicates with a mobile station by using a radio frequency RF1 used in the macrocell 6 having a lower HCS priority level.

4 Claims, 13 Drawing Sheets

(51) Int. Cl.
*H04W 72/08* (2009.01)
*H04W 24/10* (2009.01)
*H04W 48/20* (2009.01)
*H04W 72/06* (2009.01)

(58) Field of Classification Search
USPC ................. 455/432–441, 452.1; 370/331
See application file for complete search history.

(56) References Cited

U.S. PATENT DOCUMENTS

| | | | |
|---|---|---|---|
| 6,453,166 | B1 | 9/2002 | Ishikawa et al. |
| 7,546,126 | B2* | 6/2009 | Beasley ............ H04W 36/0083 455/41.2 |
| 7,965,672 | B2* | 6/2011 | Kim .................... H04W 36/22 370/327 |
| 8,320,331 | B2* | 11/2012 | Vikberg et al. ............. 370/331 |
| 8,731,576 | B2* | 5/2014 | Hamabe et al. .......... 455/452.2 |
| 8,744,466 | B2* | 6/2014 | Hirano et al. ............ 455/452.1 |
| 2005/0148368 | A1* | 7/2005 | Scheinert et al. ............ 455/561 |
| 2009/0059868 | A1* | 3/2009 | Rajasimman et al. ........ 370/332 |

FOREIGN PATENT DOCUMENTS

| | | |
|---|---|---|
| EP | 0 866 628 A2 | 9/1998 |
| EP | 0 898 436 A2 | 2/1999 |
| EP | 0973353 A1 | 1/2000 |
| GB | 2 428 937 A | 2/2007 |
| JP | 11-252636 A | 9/1999 |
| WO | 94/06220 A1 | 3/1994 |

OTHER PUBLICATIONS

3GPP TS 36.300 V8. 1.0., 3rd Generation Partnership Project; Technical Specification Group Radio Access Network; Evolved Universal Terrestrial Radio Access (E-UTRA) and Evolved Universal Terrestrial Radio Access Network (E-UTRAN); Over description; Stage 2 (Release 8), Jun. 2007.

Chinese Office Action dated Aug. 1, 2012, issued by the State Intellectual Property Office of the People's Republic of China in counterpart Chinese Application No. 200880109919.7.

Japanese Office Action dated Jun. 18, 2013 issued by the Japanese Patent Office in correspondence to Application No. 2009-536006.

Non Final Office Action issued Oct. 5, 2012, in U.S. Appl. No. 12/681,063.

Final Office Action issued Sep. 12, 2013, in U.S. Appl. No. 12/681,063.

Notice of Allowance issued Jan. 7, 2014, in U.S. Appl. No. 12/681,063.

* cited by examiner

WIRELESS COMMUNICATION SYSTEM, WIRELESS COMMUNICATION METHOD, BASE STATION, MOBILE STATION, BASE STATION CONTROL METHOD, MOBILE STATION CONTROL METHOD, AND CONTROL PROGRAM

CROSS REFERENCE TO RELATED APPLICATIONS

This application is a Continuation Application of U.S. application Ser. No. 12/681,063 filed Mar. 31, 2010, which claims priority from the National Stage of International Application No. PCT/JP2008/066629 filed Sep. 16, 2008, claiming priority based on Japanese Patent Application No. 2007-257709 filed Oct. 1, 2007, the disclosures of which are incorporated herein by reference in their entirety.

TECHNICAL FIELD

The present invention relates to a wireless communication system, in particular a system in which at least one of base stations autonomously performs radio resource management (e.g., selects a radio frequency used for communication from a plurality of radio frequencies), a wireless communication method, a base station and a mobile station, a base station and mobile station control method, and a base station and mobile station control program.

BACKGROUND ART

In recent years, as the demand for indoor voice communication and data communication has grown due to the spread of mobile phones, the development of a home-use base station installed indoors has been pursued. Since a range covered by a home-use base station is considerably smaller than that of a base station installed outdoor, the range is called "femtocell". Accordingly, a home-use base station is referred to as "femto base station" hereinafter.

In base stations in existing mobile communication networks, the radio frequency (hereinafter, simply called "RF") used for communication with a mobile station in each cell formed by a base station is set in advance to a fixed value. In contrast to this, for femto base stations, a way of autonomously performing radio resource control has been studied. For example, in a femto station, the RF used for communication with a mobile station is not determined in advance. Therefore, a way of selecting an RF in which the signal reception level of each selection candidate for the RF to be used is measured and then the RF having the minimum reception level is autonomously selected for the communication with a mobile station has been studied. Patent document 1 (page 14, line 8 to page 15, line 10) discloses a method like this.

Its specific example is explained with reference to FIG. 14. Referring to FIG. 14, a base station 811 communicates with a mobile station (not shown) by using radio frequencies RF1 and RF2, while a base station 812 communicates with a mobile station by using a radio frequency RF1. In such a case, if the radio frequencies RF1 and RF2 are selection candidates, a femto base station 821 measures the signal reception level of each of the radio frequencies RF1 and RF2. Then, the femto base station 821, which is located within the cell of the base station 812, selects and uses RF2 because the reception level of RF2, which is not used by the base station 812, is lower than that of RF1, which is used by the base station 812.

The femto base station like the one described above has been studied for use in systems such as WCDMA and E-UTRAN. In WCDMA, data transmission is performed by using an dedicated channel, of which transmission power is controlled, on an uplink and a downlink, or is performed by using a shared channel on a downlink as shown in Non-patent document 1. Further, in E-UTRAN, a radio frequency band is divided into a plurality of PRBs (Physical Resource Blocks) as shown in Non-patent document 2. A scheduler provided in an E-UTRAN base station assigns PRBs, and a base station performs data transmission with a mobile station by using an assigned PRB.

[Patent Document 1]
UK Patent Application Publication No. 2428937 A

[Non Patent Document 1]
3GPP TS 25.214 V7.3.0 (2006-12), 3rd Generation Partnership Project; Technical Specification Group Radio Access Network; Physical layer procedures (FDD) (Release 7)

[Non Patent Document 2]
3GPP TS 36.300 V8.1.0 (2007-06), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)

DISCLOSURE OF INVENTION

Technical Problem

Next, as shown in FIG. 15, a case where a femto base station is installed in a system in which a macro base station and a micro base station are located is analyzed. The macro base station communicates with a mobile station located within a relatively larger area called "macrocell", while the micro base station communicates with a mobile station located within an area smaller than the macrocell called "microcell".

In this system, assume that the macro base station 911 and the micro base station 921 use radio frequencies RF1 and RF2 respectively. Further, assume also that the micro base station 921 transmits a signal on a downlink with a transmission power smaller than that of the macro base station 911. Further, assume that femto base stations 931 to 933 measure the reception levels of RF1 and RF2, and select and use one of RF1 and RF2 for which the reception level is lower. In this case, if this micro base station 921 is located in a place relatively close to the macro base station 911 within the macrocell 901, the reception level of RF1 is higher than that of RF2 in the femto base station 931 located within the microcell 902. Therefore, the femto base station 931 selects and uses RF2, which is also used by the micro base station 921.

If both of the micro base station 921 and the femto base station 931, which is located within the microcell 902 of the micro base station 921, use the same frequency RF2, the same RF is used between the femto base station 931 and the mobile station 941 and between the micro base station 921 and the mobile station 942 in a situation where the distance between the base station and the mobile station that are not connected with each other is small. As a result, the link quality could deteriorate significantly due the interference described below in the example of FIG. 15.

(1) The transmission signal on the downlink of the femto base station 931 (link from the femto base station 931 to the mobile station 942) acts as an interference signal to the downlink of the micro base station 921 (link from the micro base station 921 to the mobile station 941).

(2) The transmission signal on the uplink of the femto base station 931 (link from the mobile station 942 to the femto base station 931) acts as an interference signal to the uplink of the micro base station 921 (link from the mobile station 941 to the micro base station 921).

(3) The transmission signal on the downlink of the micro base station 921 acts as an interference signal to the downlink of the femto base station 931.

(4) The transmission signal on the uplink of the micro base station 921 acts as an interference signal to the uplink of the femto base station 931.

Further, for example, if the transmission power of the micro base station 921 is increased to prevent the deterioration caused by the item (1), it could become a factor to decrease the line capacity of the microcell 902.

Further, assume that the femto base station 932 and the femto base station 933, which are adjacent to each other, are not located within the microcell 902, but are located in a place relatively far from the macro base station 911 within the macrocell 901. Assume also that the femto base station 933 has already selected and has been using RF2 for which the reception level is lower. In this case, in the femto base station 932, since the reception level of RF2 from the femto base station 933 is higher than the reception level of RF1 from the macro base station 911, RF1 is selected and used. As a result, it causes a problem that the uplink and the downlink between the macro base station 911 and the mobile station 943 and the uplink and the downlink between the femto base station 932 and the mobile station 944 interfere with each other. This interference causes a more serious problem in comparison to the problem caused by the interference that occurs when the same radio frequency RF2 is used in the femto base station 932 and the femto base station 933. This is because since the mobile station 943 is located in a place relatively far from the macro base station 911, the reception level on the downlink to the mobile station 943 is lower and the transmission power on the uplink of the mobile station 943 becomes larger.

Further, as a way of operation, it has been assumed that femto base stations are connected only to mobile stations that are registered in advance. Therefore, there is a case in which a mobile station that is not permitted to connect to a femto base station and is permitted to connect only to a macro base station and a micro base station communicates with the macro base station or micro base station in the close proximity of the femto base station. In such a case, in particular, the above-described interference causes a significant problem.

The present invention has been made based on the above-described findings, and an object of the present invention is to provide a wireless communication system, a wireless communication method, a base station, a mobile station, a base station control method, a mobile station control method, and a base station control program in which interference between a transmission signal on the uplink and the downlink of a femto base station and a transmission signal on the uplink and the downlink of a macro base station and/or a micro base station is alleviated.

Technical Solution

A wireless communication system in accordance with a first aspect of the present invention includes a first base station, a second base station, and a third base station. The first base station transmits a first downlink signal by using a first radio resource and communicates with a mobile station within a first cell. The second base station transmits a second downlink signal by using a second radio resource and communicates with a mobile station within a second cell. Further, at least one of the first and second base stations transmits cell attribute information indicating a cell attribute. Furthermore, the third base station measures at least reception quality of the first downlink signal, receives the cell attribute information, performs radio resource management based on a measurement result of the reception quality and the cell attribute information, and communicates with a mobile station within a third cell.

Further, a base station in accordance with a second aspect of the present invention is a base station used in a wireless communication system. Note that the wireless communication system includes a first base station that transmits a first downlink signal by using a first radio resource and communicates with a mobile station within a first cell, and a second base station that transmits a second downlink signal by using a second radio resource and communicates with a mobile station within a second cell. Further, the wireless communication system is configured such that at least one of the first and second base stations transmits cell attribute information indicating a cell attribute. Further, the base station measures at least reception quality of the first downlink signal, receives the cell attribute information, performs radio resource management based on a measurement result of the reception quality and the cell attribute information, and communicates with a mobile station within a third cell.

Furthermore, a mobile station in accordance with a third aspect of the present invention is used in a wireless communication system in accordance with the first aspect of the present invention, and communicates with the third base station.

Furthermore, a mobile station in accordance with a fourth aspect of the present invention is used in a wireless communication system in accordance with the first aspect of the present invention, and receives the cell attribute information and selects a cell by using the cell attribute information.

Further, a mobile station in accordance with a fifth aspect of the present invention is used in a wireless communication system. Note that the wireless communication system includes a first base station that transmits a first downlink signal by using a first radio resource within a first cell, and a second base station that transmits a second downlink signal by using a second radio resource within a second cell. Further, the wireless communication system also includes a third base station that performs radio resource management based on at least one of reception quality of the first downlink signal and the cell attribute information and communicates with the mobile station within a third cell. Further, the mobile station performs at least one of measurement of reception quality of the first downlink signal and reception of the cell attribute information, and notifies at least one of a measurement result of reception quality of the first downlink signal and the cell attribute information to the third base station.

Further, a mobile station in accordance with a sixth aspect of the present invention is used in a wireless communication system. Note that the wireless communication system includes a first base station that transmits a first downlink signal by using a first radio resource within a first cell, and a second base station that transmits a second downlink signal by using a second radio resource within a second cell. Further, the wireless communication system also includes a third base station that uses a radio resource selected based on at least one of reception quality of the first downlink signal and the cell attribute information, and communicates with the mobile station within a third cell. Further, the mobile station performs measurement of reception quality of the first downlink signal and reception of the cell attribute information, and notifies a radio resource selected from a plurality of selection candidates based on a measurement result of reception quality of the first downlink signal and the cell attribute information to the third base station.

Advantageous Effects

The third base station included in a wireless communication system in accordance with the first aspect of the present invention performs radio resource management by using not only the reception quality of the first and second downlink signals but also the cell attribute information. Therefore, third base station can perform radio resource management with consideration given to not only the usage state of the radio resource used by the first and second base stations forming cells near the third base station but also the attribute of these nearby cells. An example of the radio resource management is to estimate a cell that a mobile station located near the third base station selects and communicates with based on cell attribute information, and thereby to select a radio resource to be used for communication between the third base station and a mobile station while avoiding a radio resource used in the estimated cell. Further, other examples of the radio resource management include, in a situation where the occurrence of interference between a radio resource used in a cell that a mobile station located near the third base station selects and communicates with and a radio resource used in the third base station is predicted, to control to lower the transmission power of the third base station. By performing radio resource management with consideration given to the attribute of a nearby cell in this manner, the interference between the link of the third base station and the link of the first or second base station can be alleviated.

Further, a base station in accordance with the second aspect of the present invention performs radio resource management by using not only the reception quality of the first and the second downlink signals but also the cell attribute information Therefore, third base station can perform radio resource management with consideration given to not only the usage state of the radio resource used by the first and second base stations forming cells in the vicinity but also the attribute of these nearby cells. By performing radio resource management with consideration given to the attribute of a nearby cell in this manner, the interference between the link of the third base station and the link of the first or second base station can be alleviated.

Further, a mobile station in accordance with the third aspect of the present invention communicates with the third base station according to the radio resource management of the third base station. Therefore, the interference with the link of the first or second base station can be alleviated.

Further, a mobile station in accordance with the fourth aspect of the present invention receives the cell attribute information and selects a cell by using the cell attribute information. Therefore, for example, the cell to which a mobile station connects can be selected base on the radio resource management performed by the third base station, and therefore the interference with the third cell can be alleviated more effectively.

Further, a mobile station in accordance with the fifth aspect of the present invention can cooperate with the third base station for the radio resource management by notifying at least one of a measurement result of reception quality of the first downlink signal and the cell attribute information to the third base station. Therefore, the mobile station can contribute to the alleviation of the interference between the link of the third base station and the link of the first or second base station.

Further, a mobile station in accordance with the sixth aspect of the present invention can cooperate with the third base station for the radio resource management by notifying a radio resource selected from a plurality of selection candidates to the third base station. Therefore, the mobile station can contribute to the alleviation of the interference between the link of the third base station and the link of the first or second base station.

Figure 1:
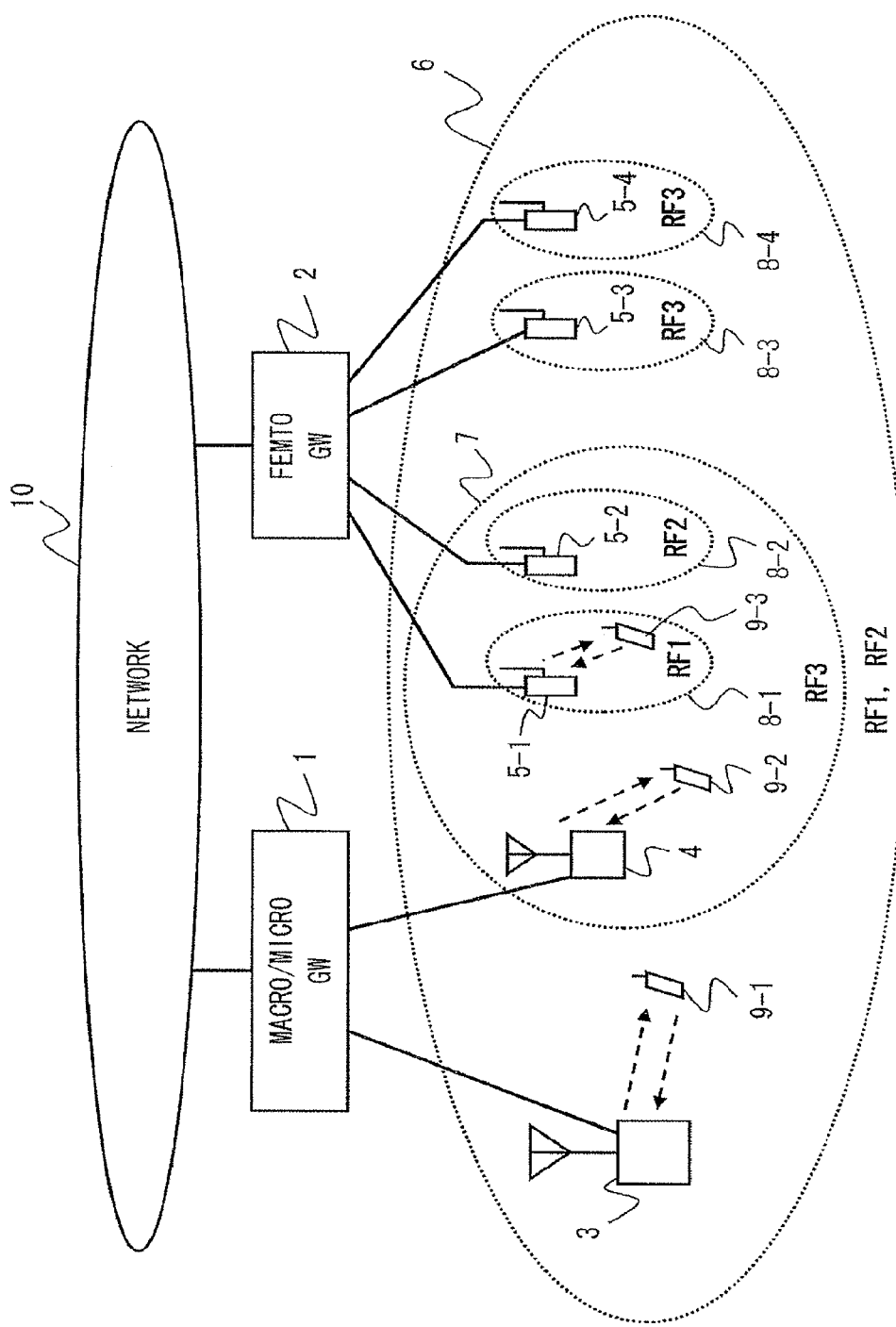
FIG. 1 shows a system configuration in accordance with first to seventh exemplary embodiments of the present invention.

EXPLANATION OF REFERENCE 1 macro/micro gateway apparatus
2 femto gateway apparatus
3 macro base station
4 micro base station 5-1 to 5-4 femto base station
6 macrocell
7 microcell
8-1 to 8-4 femtocell
9-1 to 9-3 mobile station
10 network
50 antenna
51 wireless transmission/reception unit
52 reception data processing unit
53 transmission data processing unit
54 wired transmission/reception unit
55 mobile-station mode receiving unit
56 radio network control data setting unit
57 radio network control unit
90 antenna
91 wireless transmission/reception unit
92 reception data processing unit
93 transmission data processing unit
94 buffer unit
95 cell selection control unit

BEST MODE FOR CARRYING OUT THE INVENTION

Exemplary embodiments of the present invention are explained hereinafter with reference to the drawings. FIG. 1 is a configuration diagram of a wireless communication system in accordance with first to seventh exemplary embodiments of the present invention. A wireless communication system in accordance with this exemplary embodiment includes a macro/micro gateway apparatus 1, a femto gateway apparatus 2, a macro base station 3, a micro base station 4, femto base stations 5-1 to 5-4, a macrocell 6, a microcell 7, femtocells 8-1 to 8-4, and mobile stations 9-1 to 9-3.

The macro base station 3, the femto base station 4, and the femto base stations 5-1 to 5-4 form the macrocell 6, the microcell 7, and the femtocells 8-1 to 8-4 respectively. The macro base station 3, the femto base station 4, and the femto base station 5-1 communicate with the mobile stations 9-1, 9-2 and 9-3 located in their respective cells. The number of cells formed by each base station may be more than one. However, each base station forms one cell in this exemplary embodiment.

The macro/micro gateway apparatus 1 is connected to each of the macro base station 3 and the micro base station 4. The femto gateway apparatus 2 is connected to the femto base stations 5-1 to 5-4. Further, these gateway apparatuses, which are also connected to a network 10 in a higher layer, control communication and perform information transmission between the higher network 10 and a mobile station(s) located within the cell of a subordinate base station.

The wireless communication system in accordance with this exemplary embodiment may also include a number of other macro base stations, micro stations, and femto base stations, macrocells, microcells, and femtocells corresponding to those base stations, and mobile stations in addition to those shown in FIG. 1. However, their illustration is omitted in the figure.

Figure 2:
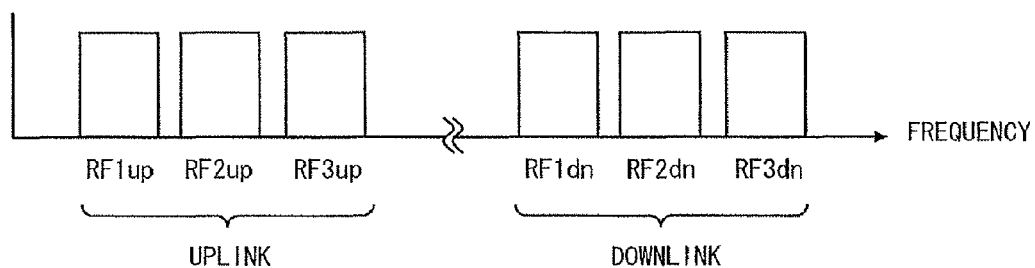
FIG. 2 is an arrangement plan of radio frequencies in accordance with first to seventh exemplary embodiments of the present invention.

FIG. 2 is an arrangement plan of RFs used in a wireless communication system in accordance with this exemplary embodiment. In the wireless communication system in accordance with this exemplary embodiment, there are three RFs, i.e., RF1up, RF2up and RF3up for the uplink, and another three RFs, i.e., RF1dn, RF2dn and RF3dn for the downlink. Further, RF1up and RF1dn are used in a pair; RF2up and RF2dn are used in a pair; and RF3up and RF3dn are used in a pair. Hereinafter, these pairs are represented by RF1, RF2 and RF3 respectively.

A fixed RF is set in advance for use in each of the macrocell 6 and the microcell 7. In first to seventh exemplary embodiments described below, assume that RF1 and RF2 are assigned to the macrocell 6 and RF3 is assigned to the microcell 7. Meanwhile, RFs used in the femtocells 8-1 to 8-4 are selected by the femto base stations 5-1 to 5-4 respectively. The selection method is described later.

Further, the macro base station 3, the micro base station 4, and the femto base stations 5-1 to 5-4 transmit a pilot signal on the downlink by using a CPICH (Common Pilot Channel) for each RF used by the respective one of the base stations within the respective one of the cells, and also transmit control information containing cell selection information by using a BCCH (Broadcast Control Channel). The cell selection information contains a HCS (Hierarchical Cell Structure) priority level, connection restriction information, cell identification number information, and femtocell information.

Further, each of the macro base station 3, the micro base station 4, and the femto base stations 5-1 to 5-4 transmits downlink data to a mobile station (e.g., mobile stations 9-1 to 9-3) by using a downlink data channel, and receives uplink data from a mobile station by using an uplink data channel.

In the macro base station 3 and the micro base station 4, the transmission power value of a pilot signal is set such that the larger the cell formed by each base station is, the larger value the transmission power is set to.

The femto base stations 5-1 to 5-4 set a value obtained by adding a constant offset value to the reception level of a pilot signal transmitted from other base stations at the used RF in decibel value as the transmission power value of a pilot signal. However, the upper-limit value and the lower-limit value are specified in advance for the transmission power value of a pilot signal by a femtocell, and the femto base stations 5-1 to 5-4 determine the transmission power value of a pilot signal within the range between the upper-limit value and the lower-limit value. Note that the reception level of a pilot signal used in this process in first to third and fifth to seventh exemplary embodiments described later is individually measured by each of the femto base stations 5-1 to 5-4 in a mobile-station mode described later. Meanwhile, in a fourth exemplary embodiment described later, a mobile station measures the reception level of a pilot signal, and the femto base stations 5-1 to 5-4 calculate the transmission power value of a pilot signal by using the reception level of a pilot signal notified from the mobile station. The cells for which the reception level of a pilot signal is to be measured are the macrocell 6 and microcell 7, which are cells to which connection restriction information described later has not been transmitted. Further, if there are two or more cells which use the selected RF and for which the measurement is to be performed, the femto base stations 5-1 to 5-4 use the reception level of the pilot signal of a cell for which the reception level of a pilot signal is the largest for the calculation of the transmission power value of a pilot signal.

The transmission power value of a BCCH is a value obtained by adding a constant offset value to the transmission power value of a pilot signal in decibel value in each cell.

In the wireless communication system in accordance with this exemplary embodiment, all the mobile stations 9-1 to 9-3 are permitted to connect to the macro base station 3 and the micro base station 4. Meanwhile, only the mobile station 9-3 is permitted to connect to the femto base station 5-1.

Note that although there are mobile stations that are permitted to connect to the femto base stations 5-2 to 5-4, their illustration is omitted in the figure.

To permit the connection only to a specified mobile station(s), the femto base stations 5-1 to 5-4 transmits cell identification number information, and also transmits connection restriction information indicating that it is a cell that permits the connection only to a specified mobile station(s) in each cell. Meanwhile, each of the mobile stations 9-1 to 9-3 retains the cell identification number information of a cell for which the connection is permitted. Further, when the cell identification number transmitted in the respective cells matches with the retained cell identification number, the mobile stations 9-1 to 9-3 select the cell as a cell selection candidate.

Further, the femto base stations 5-1 to 5-4 may transmit femtocell information indicating that they are femtocells, as a substitute for the connection restriction information, with the cell identification number information. In the case like this, a mobile station also retains the cell identification number information of a femtocell for which the connection is permitted. Further, when it matches with cell identification number information transmitted from a base station, the mobile station defines the femtocell as a cell selection candidate.

Further, in a femtocell, the permission for connection does not necessarily have to be restricted to certain mobile stations, and may be given to all the mobile stations. In such a case, the base station transmits a specific cell identification number indicating that all the mobile stations are permitted to connect to the base station. Then, when a mobile station receives this specific cell identification number, the mobile station defines the cell as a selection candidate.

The femto base stations 5-1 to 5-4 suspend the transmission of all radio signals and perform the measurement of a pilot signal transmitted from other base stations and the reception of cell selection information. By doing so, the femto base stations 5-1 to 5-4 select an RF to be used in the femtocells 8-1 to 8-4, and determine the transmission power value of a pilot signal to be transmitted in these cells. The state like this, in which the femto base stations 5-1 to 5-4 perform the measurement of a transmission signal from other base stations and the reception of control information transmitted from other base stations, is referred to as "mobile-station mode".

Note that although this exemplary embodiment adopts a FDD (Frequency Division Duplex) mode in which different radio frequencies are used in the uplink and the downlink, the present invention can be also practiced in a completely similar manner in embodiments using a TDD (Time Division Duplex) mode in which the same radio frequency is used in both the uplink and the downlink in a time-division manner.

First Exemplary Embodiment

A wireless communication system in accordance with this exemplary embodiment may adopt any mode as the communication mode between a base station and a mobile station. However, a CDMA mode is adopted as the wireless access mode and a transmission signal is spread over the band of each RF in a first exemplary embodiment. Further, the macro/micro gateway apparatus 1 in accordance with the first exemplary embodiment is equipped with an RNC (Radio Network Controller) function. In this way, the macro/micro gateway apparatus 1 notifies the macro base station 3 and the micro base station 4 of a predetermined RF, the transmission power of a pilot signal, and the like for each cell.

Figure 3:
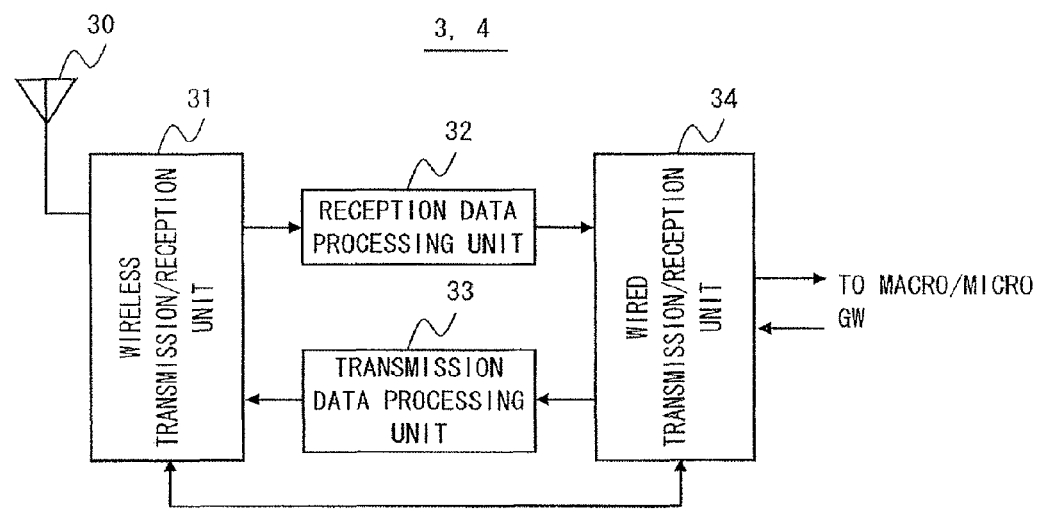
FIG. 3 shows a configuration of a macro base station and a micro base station in accordance with first to sixth exemplary embodiments of the present invention.

FIG. 3 shows an example of a configuration of a macro base station 3 and a micro base station 4. Referring to FIG. 3, each of the macro base station 3 and micro base station 4 in accordance with this exemplary embodiment includes an antenna 30, a wireless transmission/reception unit 31, a reception data processing unit 32, a transmission data processing unit 33, and a wired transmission/reception unit 34.

The wireless transmission/reception unit 31 receives a notification of an RF, the transmission power value of a pilot signal, and the like for each cell from the macro/micro gateway apparatus 1 through the wired transmission/reception unit 34, and transmits a pilot signal based on the notification. Further, the wireless transmission/reception unit 31 receives downlink data from the macro/micro gateway apparatus 1 through the wired transmission/reception unit 34 and the transmission data processing unit 33, and transmits the received downlink data through the antenna 30 toward a mobile station. Further, the wireless transmission/reception unit 31 receives uplink data from a mobile station through the antenna 30, and transmits the received data to the macro/micro gateway apparatus 1 through the reception data processing unit 32 and the wired transmission/reception unit 34.

Figure 4:
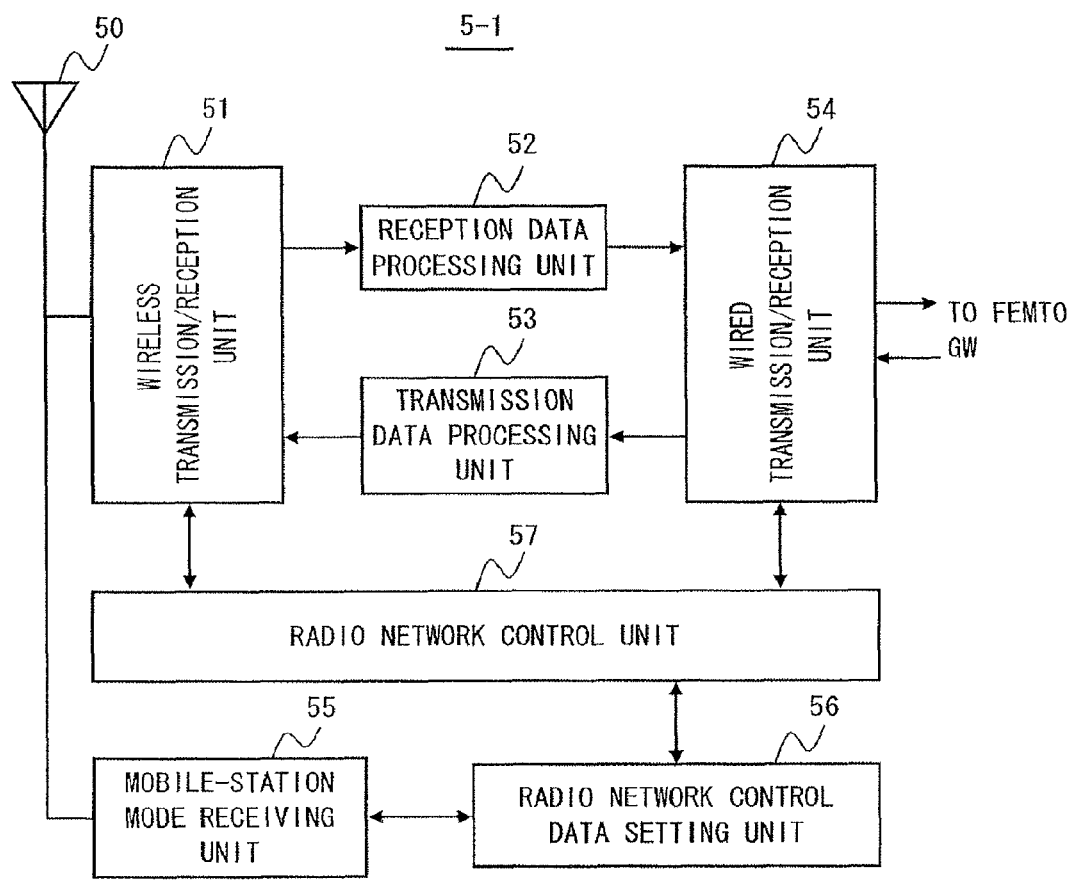
FIG. 4 shows a configuration of a femto base station in accordance with first to third and fifth to seventh exemplary embodiments of the present invention.

FIG. 4 shows an example of a configuration of a femto base station 5-1. Note that each of the other femto stations 5-2 to 5-4 may have a similar configuration. Referring to FIG. 4, the femto base station 5-1 in accordance with this exemplary embodiment includes an antenna 50, a wireless transmission/reception unit 51, a reception data processing unit 52, a transmission data processing unit 53, a wired transmission/reception unit 54, a mobile-station mode receiving unit 55, a radio network control data setting unit 56, and a radio network control unit 57.

The mobile-station mode receiving unit 55 measures the reception level of a pilot signal of a cell using a selection candidate RF through the antenna 50, and receives cell selection information. The radio network control data setting unit 56 receives a notification of the reception level of the pilot signal and the cell selection information from the mobile-station mode receiving unit 55, selects an RF, determines the transmission power value of a pilot signal, and transmits them to the radio network control unit 57. The radio network control unit 57, which has an RNC function, notifies the RF to be used and the transmission power value of a pilot signal to the wireless transmission/reception unit 51. Then, the wireless transmission/reception unit 51 receives the notification of the RF and the transmission power value of a pilot signal from the radio network control unit 57, and transmits a pilot signal based on the notification. Further, similarly to the wireless transmission/reception unit 31 of the macro base station 3 and micro base station 4, the wireless transmission/reception unit 51 performs data transmission/reception of downlink/uplink data.

Figure 5:
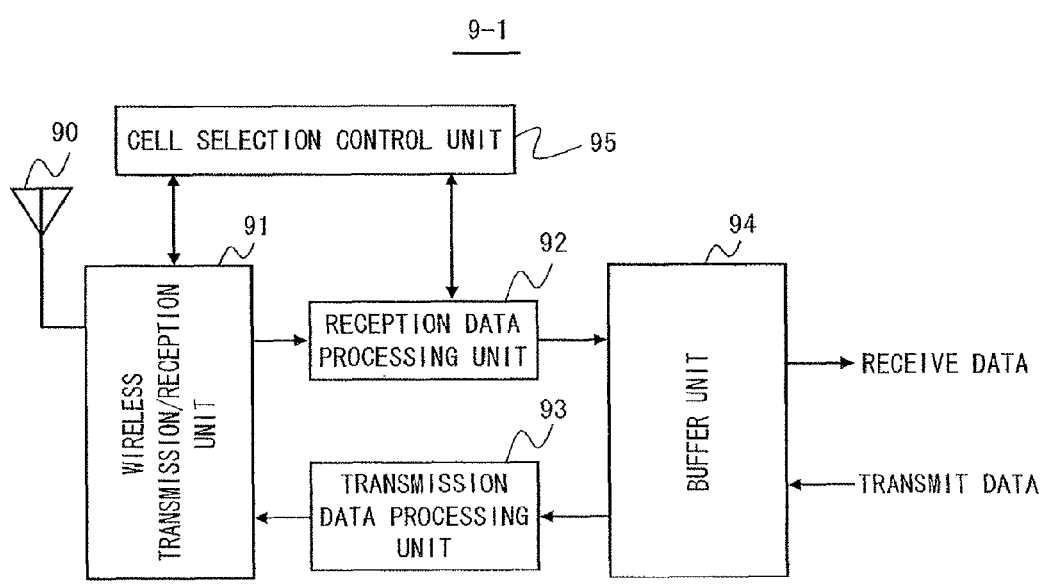
FIG. 5 shows a configuration of a mobile station in accordance with first to third and fifth to seventh exemplary embodiments of the present invention.

FIG. 5 shows an example of a configuration of a mobile station 9-1. Note that each of the other mobile stations 9-2 and 9-3 may have a similar configuration. Referring to FIG. 5, the mobile station 9-1 in accordance with this exemplary embodiment includes an antenna 90, a wireless transmission/reception unit 91, a reception data processing unit 92, a transmission data processing unit 93, a buffer unit 94, and a cell selection control unit 95. The wireless transmission/reception unit 91 receives downlink data through the antenna 90, and transmits the received data to the buffer unit 94 through the reception data processing unit 92. The downlink data stored in the buffer unit 94 is read out and used according to its purpose. Further, the wireless transmission/reception unit 91 receives uplink data stored in the buffer unit 94 through the transmission data processing unit 93, and transmits the received data through the antenna 90 toward a base station (e.g., macro base station 3).

Further, the wireless transmission/reception unit 91 measures the reception level of a pilot signal for each selection candidate cell, and transmits a measurement result(s) to the cell selection control unit 95. The cell selection control unit 95 selects the cell with which the mobile station performs communication by using the measurement result and cell selection information received through the antenna 90, wireless transmission/reception unit 91, and reception data processing unit 92, and transmits the selection result to the wireless transmission/reception unit 91. Then, the wireless transmission/reception unit 91 performs communication in the cell selected by the cell selection control unit 95.

Figure 6:
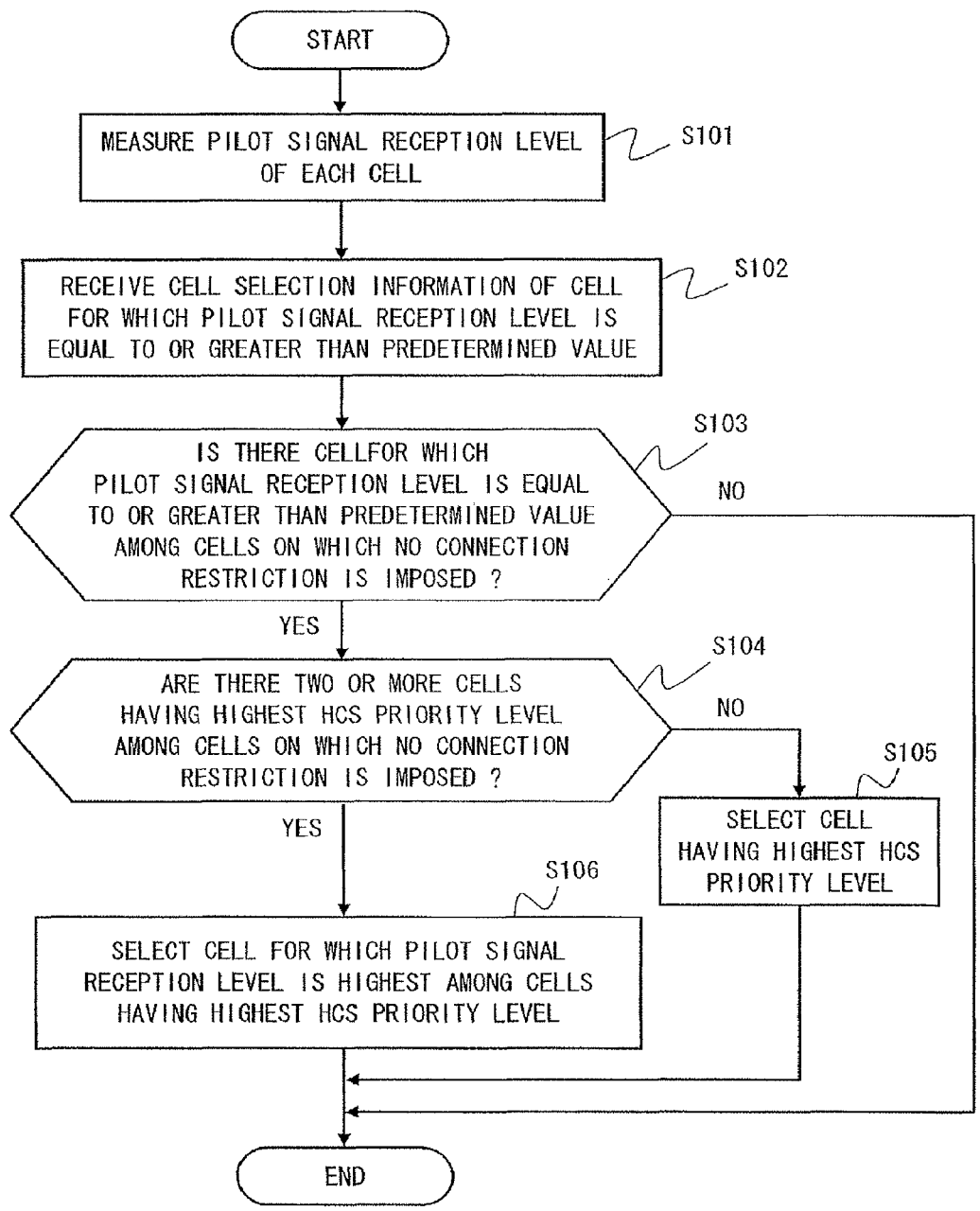
FIG. 6 shows procedure for selecting a radio frequency in accordance with first to third and fifth to seventh exemplary embodiments of the present invention.

As described above, the mobile stations 9-1 to 9-3 in accordance with this exemplary embodiment selects a cell with which the mobile stations perform communication by using the measurement result of the reception level of a pilot signal for each selection candidate cell and cell selection information. The details of cell selecting procedure performed by the mobile stations 9-1 to 9-3 are explained hereinafter with reference to a flowchart shown in FIG. 6.

In a step S101, the mobile stations 9-1 to 9-3 measure the reception level of a pilot signal transmitted from a base station located in the vicinity. In a step S102, the mobile stations 9-1 to 9-3 receives cell selection information of a cell for which the reception level of a pilot signal is equal to or greater than a predefined value $PM_{TH}$. In a step S103, the mobile stations 9-1 to 9-3 refers to connection restriction information contained in the cell selection information in order to determine whether or not there is any cell for which the reception level of a pilot signal is equal to or greater than the predetermined value $PM_{TH}$ among the cells on which the connection restriction is not imposed. In a step S103, if any cell for which the reception level of a pilot signal is greater than the predetermined value $PM_{TH}$ and on which the connection restriction is not imposed is not found, the mobile stations 9-1 to 9-3 terminates the cell selecting procedure of FIG. 6 and starts the cell selection procedure again from the beginning.

Meanwhile, if there is a cell(s) for which the reception level of a pilot signal is equal to or greater than the predetermined value $PM_{TH}$ and on which the connection restriction is not imposed, the mobile stations 9-1 to 9-3 determine whether or not there are two or more cells for which an HCS priority level is the highest among the cells (step S104). Then, if the number of the cells for which the HCS priority level is the highest is only one, the mobile stations 9-1 to 9-3 selects that cell as a cell to which the mobile station connects (hereinafter referred to as "destination cell") (step S105). Further, if there are two or more cells for which the HCS priority level is the highest, the mobile stations 9-1 to 9-3 select a cell for which the reception level of a pilot signal is the highest among the cells for which the HCS priority level is the highest (step S106).

Next, a specific cell selection operation performed by the mobile stations 9-1 to 9-3 is explained hereinafter with reference to FIG. 1. Note that the macro base station 3 in accordance with this exemplary embodiment transmits an HCS priority level as the cell selection information. To increase the possibility that the mobile stations 9-1 to 9-3 and/or the femto base stations 5-1 to 5-4 in a mobile-station mode can receive cell selection information, the micro base station 4 may also transmit the same cell selection information as that transmitted by the macro base station 3 in addition to the macro base station 3.

The cell selection information transmitted by the macro base station 3 contains the HCS priority level HCS_PRI06 of the macrocell 6, the HCS priority level of a macrocell(s) (not shown) adjacent to the macrocell 6, and the HCS priority level HCS_PRI07 of the microcell 7 located within the macrocell 6. Further, the cell selection information also contains the HSC priority levels HCS_PRIO8-1 to HCS_PRIO8-4 of the femtocells 8-1 to 8-4. In this exemplary embodiment and second to seventh exemplary embodiments described later, the HSC priority level takes on an integer from 0 to 7. Further, the value 0 indicates the lowest priority and the valued 7 indicates the highest priority. In first to seventh exemplary embodiments, assume that HCS_PRI06=0, HCS_PRI07=2, and HCS_PRI08-1=HCS_PRI08-2=HCS_PRI08-3=HCS_PRI08-4=7. When a mobile station and a base station perform data transmission/reception, the spatial reuse efficiency of a radio frequency becomes higher when they use a smaller cell in size. Therefore, the HSC priority level is defined such that it increases with a decrease in the size of a cell.

Assume that the macrocell 6 and the microcell 7 are not cells that permit the connection only to specific mobile stations, and that the macro base station 3 and the micro base station 4 do not transmit connection restriction information of these cells and therefore no connection restriction is imposed on them. Meanwhile, assume that the femtocells 8-1 to 8-4 are cells that permit the connection only to specific mobile stations registered in advance, and that when a pilot signal is transmitted, connection restriction information is also transmitted to impose the connection restriction on them.

The mobile station 9-1 receives cell selection information from the macro base station 3, and measures the reception level of a pilot signal of the macrocell 6 and the microcell 7, on which no connection restriction is imposed. Then, since the reception level of a pilot signal of the microcell 7 is lower than the predetermined value $PM_{TH}$ required to perform communication with a base station and the reception level of a pilot signal of the macrocell 6 is higher than the predetermined value $PM_{TH}$ required to perform communication with a base station, only the macrocell 6 becomes a cell selection candidate. Therefore, the macrocell 6 is selected and connected to the macro base station 3.

Meanwhile, the mobile station 9-2 receives cell selection information from the macro base station 3 or the micro base station 4, measures the reception level of a pilot signal of the macrocell 6 and the microcell 7, on which no connection restriction is imposed. Then, since the reception levels of the pilot signals of the macrocell 6 and microcell 7 are both equal to or greater than the predetermined value $PM_{TH}$ required to perform communication with a base station and these two cell become cell selection candidates, the mobile station 9-2 selects the microcell 7 having a higher HCS priority level based on the cell selection information and connects to the micro base station 4.

Further, when the femto base station 5-1 is not operating, the mobile station 9-3 connects to the micro base station 4 as with the mobile station 9-2. Meanwhile, when the femto base station 5-1 is operating and a pilot signal is being transmitted in the femtocell 8-1, the femtocell 8-1 that permits the connection to the mobile station 9-3 is added in the cell selection candidates of the mobile station 9-3 (i.e., cells on which the connection restriction is not imposed in the steps S103 to S104). Therefore, the mobile station 9-3 selects the femtocell 8-1 having the highest HCS priority level among the cells defined as the selection candidates, and thereby connects to the femto base station 5-1.

Next, the details of an RF selection operation performed by the femto base stations 5-1 to 5-4 in accordance with this exemplary embodiment are explained. As described above, the femto base stations 5-1 to 5-4 in accordance with this exemplary embodiment measure the reception level of a pilot signal for each cell using one of selection candidates RFs (RF1, RF2 or RF3) in a mobile-station mode, and receive cell selection information from the macro base station 3. Then, if all of these reception levels of pilot signals are equal to or greater than a predefined value $PB_{TH}$, the femto base stations 5-1 to 5-4 select the RF of a cell for which the HCS priority level is lower on a preferential basis. Further, if there are two or more RFs that can be preferentially selected, the femto base stations 5-1 to 5-4 select an RF for which the reception level of a pilot signal is the lowest.

Figure 7:
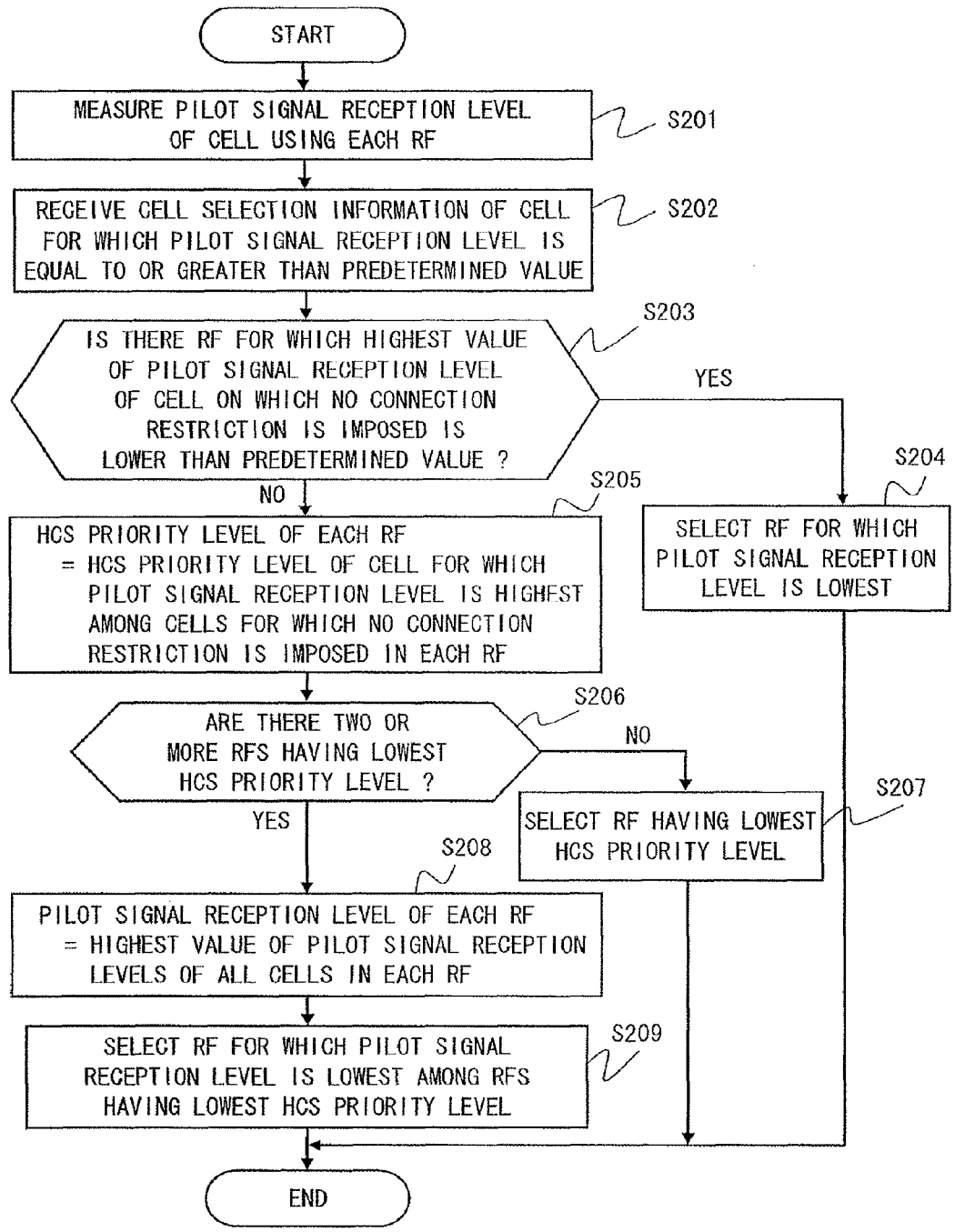
FIG. 7 shows procedure for selecting a radio frequency in accordance with first and seventh exemplary embodiments of the present invention.

FIG. 7 is a flowchart showing an example of procedure for selecting an RF performed by the femto base stations 5-1 to 5-4. The femto base stations 5-1 to 5-4 measures the reception level of a pilot signal of cells using respective RFs (macrocell, microcell, and femtocell) (step S201). Next, they receive cell selection information for which the reception level of a pilot signal is equal to or greater than a predetermined value (step S202).

Then, for each RF, the highest value of the reception levels of the pilot signals of the cells on which the connection restriction is not imposed is defined as the reception level of the pilot signal of the RF. Then, if there is any RF for which the reception level of the pilot signal is lower than the predetermined value $PB_{TH}$, that RF is selected and the procedure is terminated (steps S203 and S204).

Note that the mobile stations 9-1 to 9-3 select a cell by comparing the reception level of a pilot signal with the predetermined value $PM_{TH}$ required to perform communication with a base station as described above. The predetermined value $PB_{TH}$ used in a step S203 may have the same value as the predetermined value $PM_{TH}$ used by a mobile station for the cell selection, or a different value from the predetermined value $PM_{TH}$. If the femto base stations 5-1 to 5-4 are installed indoors, the reception level of a pilot signal of the macrocell 6 and/or the microcell 7 measured by the femto base stations 5-1 to 5-4 becomes smaller than the reception level measured by a mobile station located outdoors in the vicinity of the femto base stations 5-1 to 5-4 by a building penetration loss. Therefore, the predefined value $PB_{TH}$ in the step S203 may be set to a smaller value in comparison to the predetermined value $PM_{TH}$ used by a mobile station.

Further, in the step S203, if there is an RF for which no pilot signal is received from any cell, the femto base stations 5-1 to 5-4 regard the reception level of a pilot signal of that RF as a reception level lower than the predefined value $PB_{TH}$, and that RF is selected and the procedure is terminated.

When the decision in the step S203 is "No", the femto base stations 5-1 to 5-4 regard, for each RF, the HCS priority level of a cell for which the reception level of a pilot signal is the highest among the cells on which the connection restriction is not imposed as the HCS priority level of the RF (step S205). Then, if the number of the RFs for which the HCS priority level is the lowest is only one, the femto base stations 5-1 to 5-4 selects that RF for which the HCS priority level is the lowest and terminates the procedure (steps S206 and S207).

When the decision in the step S203 is "Yes", the femto base stations 5-1 to 5-4, for each RF at this time, regard the highest value of the reception levels of pilot signals of all the cells as the reception level of the pilot signal of the RF regardless of the presence/absence of the connection restriction (step S208). Then, the femto base stations 5-1 to 5-4 select an RF for which the reception level of a pilot signal is the lowest among the cells for which the HCS priority level is the lowest, and terminates the procedure (steps S209).

The RF selection made by the femto base stations 5-1 to 5-4 is further explained hereinafter with reference to FIG. 1 by using an example where the RF selection is performed in the order of the femto base station 5-1, 5-2, 5-3 and 5-4.

Firstly, the femto base station 5-1 measures the reception levels of pilot signals of RF1 and RF2 in the macrocell 6 and the reception level of a pilot signal of RF3 in the microcell 7, and receives the HCS priority level of the macrocell 6 (HCS_PRI06=0) and the HCS priority level of the microcell 7 (HCS_PRI07=2) from the macro base station 3 (steps S201 and S202). In the case of the femto base station 5-1 installed in the place shown in FIG. 1, the reception levels of pilot signals of RF1 and RF2 in the macrocell 6 is equal to or higher than the predefined value $PB_{TH}$ and the reception level of a pilot signal of RF3 in the microcell 7 is also equal to or higher than the predefined value $PB_{TH}$ in the step S203. Therefore, there is no RF for which the reception level of a pilot signal is lower than the predefined value $PB_{TH}$, RF1 and RF2 used in the macrocell 6 having the lower HCS priority level become selection candidates (Yes in the step S206). Then, in the steps S208 and S209, the femto base station 5-1 selects an RF for which the highest value of the reception levels of pilot signals of all the cells including the femtocells 8-1 to 8-4 on which the connection restriction is not imposed as well as the macrocell 6 and the microcell 7 is the lowest. At the time when the femto base stations 5-2 to 5-4 are not operating, there is no difference between the reception levels of pilot signals of RF1 and RF2. Therefore, in this case, the femto base station 5-1 selects and uses RF1 as the RF of the femtocell 8-1.

Next, the femto base station 5-2 located near the femto base station 5-1 selects an RF. In the RF selection in the femto base station 5-2, there is also no RF for which the reception level of a pilot signal is lower than the predefined value $PB_{TH}$. Further, in the steps S203 to S207, there is no influence from the femtocell 8-1 on which the connection restriction is imposed. Therefore, RF1 and RF2 used in the macrocell 6 for which the HCS priority level is lower become selection candidates. Then, when the highest value of the reception levels of pilot signals of all the cells is obtained for each of RF1 and RF2 in the step S208, the reception level of a pilot signal of RF1 becomes higher than that of RF2 due to a pilot signal transmitted in the femtocell 8-1. Therefore, the femto base station 5-2 selects and uses RF2 as the RF of the femtocell 8-2 (step S209). In this way, the interference with a nearby mobile station(s) communicating in the macrocell 6 and/or the microcell 7 can be avoided. In addition, an RF that will cause smaller interference with an adjacent femtocell 8-1 can be selected. That is, since the femto base station selects the same RF as that of a cell for which the reception level of a pilot signal is smaller, the mutual interference between cells using the same RF can be lowered even in a situation where the conflict of an RF between adjacent cells cannot be avoided.

Next, assume a case where the femto base station 5-3 selects an RF. In the installation place of the femto base station 5-3 shown in FIG. 1, while the reception levels of pilot signals of RF1 and RF2 in the macrocell 6 is equal to or greater than the predefined value $PB_{TH}$, the reception level of a pilot signal of RF3 in the microcell 7 is lower than the predefined value $PB_{TH}$. Therefore, since the reception level of a pilot signal of RF3 is determined to be lower than the predetermined value in the step S203, the femto base station 5-3 selects and uses RF3 as the RF of the femtocell 8-3 (step S204). In this way, if the reception level of a pilot signal is low and therefore there is an RF for which the probability of mutual interference is small or an RF that is not used in the vicinity, the mutual interference between the femtocell 8-3 and that particular cell (macrocell 6 in this case) can be lowered by selecting the RF like that.

Next, assume a case where the femto base station 5-4 located near the femto base station 5-3 selects an RF. In the installation place of the femto base station 5-4 shown in FIG. 1, while the reception levels of pilot signals of RF1 and RF2 in the macrocell 6 is equal to or greater than the predefined value $PB_{TH}$, the reception level of a pilot signal of RF3 in the microcell 7 is lower than the predefined value $PB_{TH}$. Meanwhile, since the connection restriction is imposed on the femtocell 8-3, the reception level of a pilot signal transmitted by the femto base station 5-3 at RF3 is excluded from the subjects on which the determination made in the step S203. Therefore, since the reception level of a pilot signal of RF3 is determined to be lower than the predetermined value $PB_{TH}$ in the step S203, the femto base station 5-4 selects and uses RF3 as the RF of the femtocell 8-4 (step S204). That is, while the reception levels of pilot signals of RF1 and RF2 in the macrocell 6 is equal to or greater than the predefined value $PB_{TH}$, the connection restriction is not imposed on the macrocell 6 but is imposed on the femtocell 8-3. Therefore, the same frequency RF3 as used in the femtocell 8-3, on which the connection restriction is imposed, is selected and used. In this way, even if the reception level of a pilot signal of the femtocell 8-3 on which the connection restriction is imposed is high, it does not have any influence on the selection of an RF made by the femto base station 5-4. Accordingly, although there is some possibility that interference occurs between the femtocell 8-3 and the femtocell 8-4, the interference between the femtocell 8-4 and the macrocell 6, which could significantly deteriorate the link quality, can be avoided.

In this exemplary embodiment, instead of transmitting the connection restriction information, femtocell information may be included in and transmitted with the cell selection information. Then, by using the femtocell information in the same manner as that of the connection restriction information, the same RF selection can be made.

Further, in this exemplary embodiment, the mobile stations 9-1 to 9-3 compares the reception level of a pilot signal for each cell with the same predetermined value $PM_{TH}$, and the femto base stations 5-1 to 5-4 compares the reception level of a pilot signal for each cell with the same predefined value $PB_{TH}$. However, an individual offset value may be defined for each cell, and the macro base station 3 or the macro base station 3 and the micro base station 4 may report the individual offset value by including it in the cell selection information. Then, in the mobile stations 9-1 to 9-3 and the femto base stations 5-1 to 5-4, the individual offset value is added to the reception level of a pilot signal and the resultant value is compared with the predetermined value $PM_{TH}$ or $PB_{TH}$. By doing so, the system can substantially have different predetermined values $PM_{TH}$ and $PB_{TH}$ for each cell.

Second Exemplary Embodiment

In the above-described first exemplary embodiment, examples in which the femto base stations 5-1 to 5-4 select an RF by referring to the HCS priority level contained in the cell selection information and the connection restriction information or the femtocell information are explained. In this exemplary embodiment, an example in which the femto base stations 5-1 to 5-4 select an RF by referring to the HCS priority level contained in the cell selection information without using the connection restriction information and the femtocell information is explained. In the RF selection like this, the femto base stations 5-1 to 5-4 can also alleviate the influence exerted on the communication of mobile stations 9-1 to 9-3 located in the vicinity.

Figure 8:
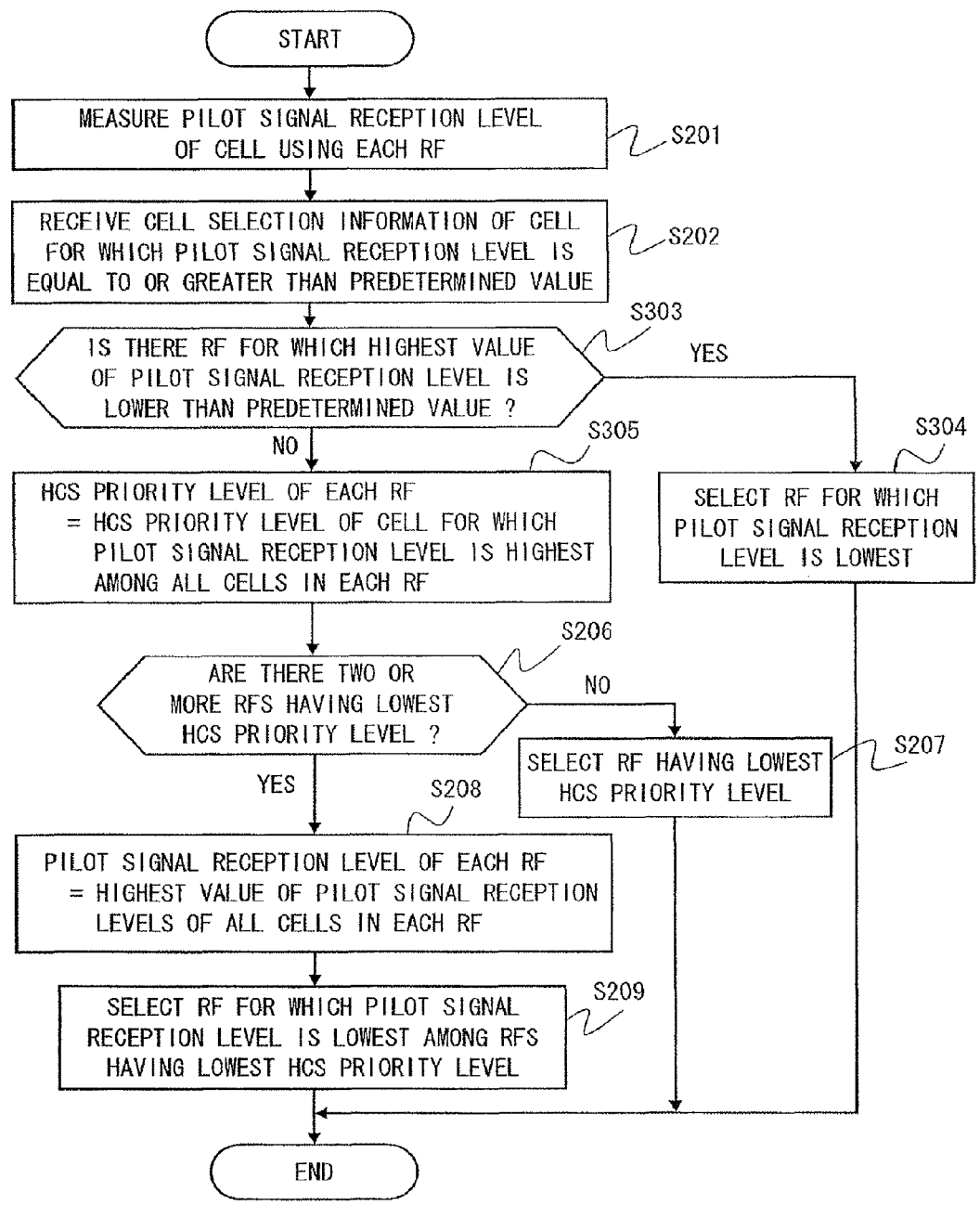
FIG. 8 shows procedure for selecting a radio frequency in accordance with a second exemplary embodiment of the present invention.

A specific example of an RF selection made by the femto base stations 5-1 to 5-4 in accordance with this exemplary embodiment is explained with reference a flowchart shown in FIG. 8. Note that in FIG. 8, steps S201, S202, and S206 to S209 are similar to the processes denoted by the same signs in the flowchart of FIG. 7. In a step S303 of FIG. 8, for each RF, the highest value of the reception levels of the pilot signals of all the cells received at the RF is defined as the reception level of the pilot signal of the RF regardless of the presence/absence of the connection restriction, and the defined reception level is compared with a predefined value $PB_{TH}$. Then, if there is any RF for which the reception level of the pilot signal is lower than the predetermined value $PB_{TH}$, that RF is selected and the procedure is terminated (steps S304).

On the other hand, if the reception levels of pilot signals of all RFs (i.e., RF1, RF2 and RF3) of the selection candidates are equal to or greater than the predefined value $PB_{TH}$, the femto base stations 5-1 to 5-4 regard, for each RF, the HCS priority level of a cell for which the reception level of a pilot signal received at the RF is the highest among all the cells as the HCS priority level of the RF regardless of the presence/absence of the connection restriction (step S305). Then, if the number of the RFs for which the HCS priority level is the lowest is only one, the femto base stations 5-1 to 5-4 select that RF for which the HCS priority level is the lowest and terminate the procedure (steps S206 and S207). When the decision in the step S203 is "Yes", the femto base stations 5-1 to 5-4 regard the highest value of the reception levels of pilot signals received at each RF as the reception level of the pilot signal of the RF, and then selects an RF for which the reception level of a pilot signal is the lowest among RFs for which the HCS priority level is the lowest (steps S208 and S209).

In this manner, the femto base stations 5-1 to 5-4 in accordance with this exemplary embodiment refer to the HCS priority level that is used by the mobile stations 9-1 to 9-3 to select a destination cell, and select an RF according to a priority order that is the reverse of the priority order used by mobile stations to select a destination cell. In other words, the femto base stations 5-1 to 5-4 in accordance with this exemplary embodiment selects an RF to be used by the femto base stations 5-1 to 5-4 themselves such that the conflict of the RF, which is used by a mobile station that is located near the femto base stations 5-1 to 5-4 but does not connect to the femto base stations 5-1 to 5-4 to connect to the macrocell 6 or the microcell 7 in the higher layer, is avoided. That is, when the mobile stations 9-1 to 9-3 can receive the pilot signals of both the macrocell 6 and the microcell 7 with a reception level equal to or greater than the predetermined value $PM_{TH}$, the mobile stations 9-1 to 9-3 select and connect to the microcell 7 for which the HCS priority level is higher. In contrast to this, when the femto base stations 5-1 to 5-4 receive the pilot signals of both the macrocell 6 and the microcell 7 with a reception level equal to or greater than the predefined value $PB_{TH}$, the femto base stations 5-1 to 5-4 select an RF that is also used by the macrocell 6 for which the HCS priority level is lower as an RF to be used by themselves based on the HCS priority level in the priority order that is the reverse of the priority order used by the mobile stations 9-1 to 9-3 to select a destination cell. In this way, the femto base stations 5-1 to 5-4 can avoid the interference with the microcell 7 to which an adjacent mobile station(s) preferentially connects, and thereby suppress the degradation in the link quality of the adjacent mobile station.

Third Exemplary Embodiment

In this exemplary embodiment, an example in which the femto base stations 5-1 to 5-4 select an RF by referring to the connection restriction information or the femtocell information without using the HCS priority level is explained. In the RF selection like this, the femto base stations 5-1 to 5-4 can also alleviate the influence exerted on the communication of mobile stations 9-1 to 9-3 located in the vicinity.

Figure 9:
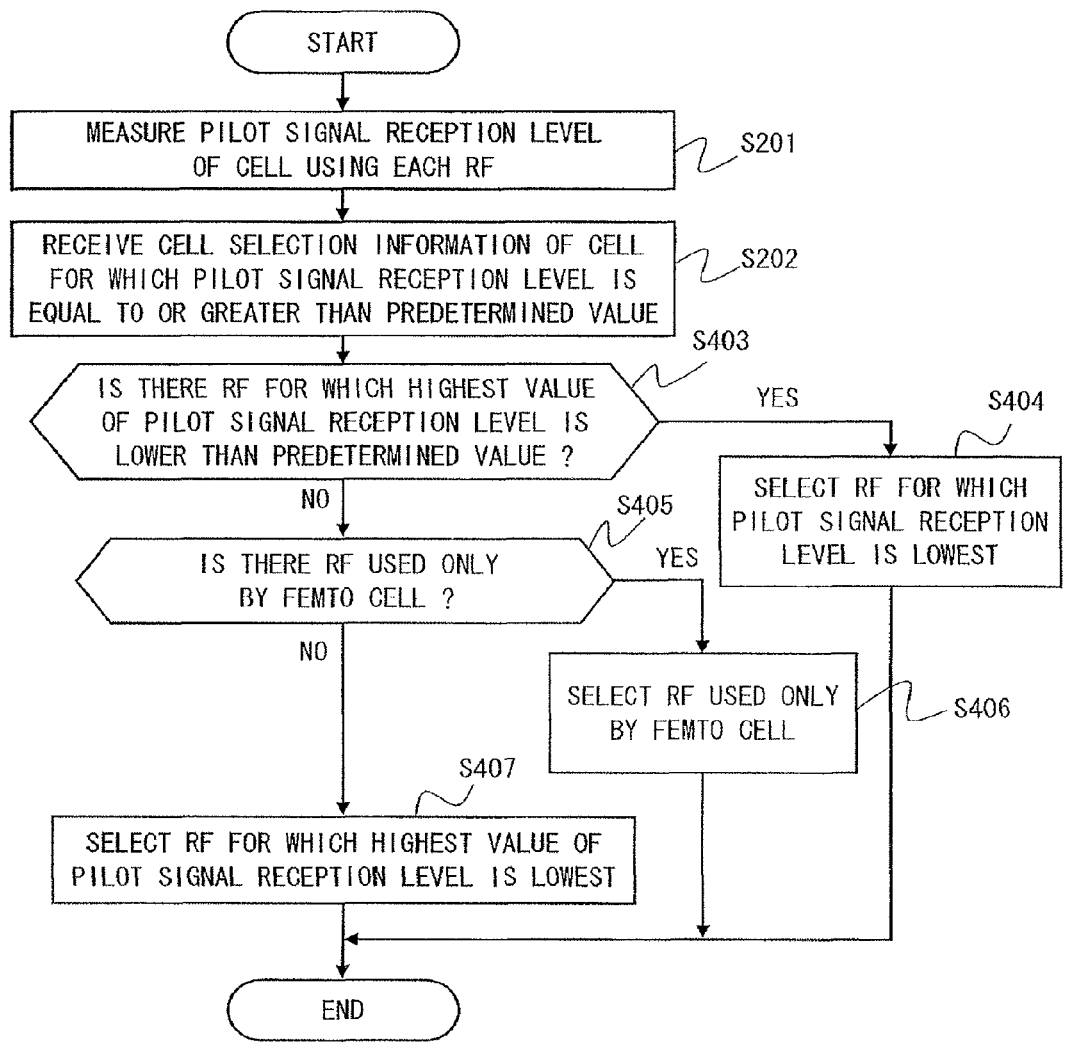
FIG. 9 shows procedure for selecting a radio frequency in accordance with a third exemplary embodiment of the present invention.

A specific example of an RF selection made by the femto base stations 5-1 to 5-4 in accordance with this exemplary embodiment is explained with reference to a flowchart shown in FIG. 9. Note that in FIG. 9, steps S201 and S202 are similar to the processes denoted by the same signs in the flowchart of FIG. 7. In a step S403 of FIG. 9, for each RF, the highest value of the reception levels of the pilot signals of all the cells received at the RF is defined as the reception level of the pilot signal of the RF, and the defined reception level is compared with a predefined value $PB_{TH}$. Then, if there is any RF for which the reception level of the pilot signal is lower than the predetermined value $PB_{TH}$, that RF is selected and the procedure is terminated (steps S404).

On the other hand, if the reception levels of pilot signals of all RFs (i.e., RF1, RF2 and RF3) of the selection candidates are equal to or greater than the predefined value $PB_{TH}$, the femto base stations 5-1 to 5-4 determines whether or not there is any RF that is used only by a femtocell(s) by referring to the connection restriction information or the femtocell information (step S405). Then, if there is any RF that is used only by a femtocell(s), the femto base stations 5-1 to 5-4 select that RF and terminate the procedure (step S406). Note that if there are two or more RFs that are used only by a femtocell(s), an RF for which the highest value of the reception levels of the pilot signals is the lowest may be selected from those RFs. When the decision in the step S405 is "No", the femto base stations 5-1 to 5-4 regard the highest value of the reception levels of all the pilot signals received at each RF as the reception level of the pilot signal of the RF, and select an RF for which the reception level of a pilot signal is the lowest (step s407).

In this manner, the femto base stations 5-1 to 5-4 in accordance with this exemplary embodiment determine whether the transmission source of a pilot signal is a femtocell or not by referring to the connection restriction information or the femtocell information. Then, if the conflict of an RF occurs with at least one of the adjacent cells no matter which RF is selected among a plurality of selection candidates, an RF that is used only by a femtocell(s) is preferentially selected. That is, even if the reception level of a pilot signal from the femtocell 8-3 is lower than the reception level of a pilot signal from the macrocell 6, for example, the femto base station 5-4 selects and uses the same RF as used in the femtocell 8-3. As a result, although interference may occur between femtocells, the femtocells 8-1 to 8-3 are small-scale cells as described above. Further, the femtocells 8-1 to 8-3 are assumed to be used in a certain form of usage in which mobile stations that are permitted to connect to the femtocells are restricted. Therefore, even if a lot of mobile stations exist near the femtocells 8-1 to 8-3, most of them cannot be connected to the femtocells 8-1 to 8-3 and thus connected to the macrocell 6 or the microcell 7 in the higher layer. Accordingly, the femto base stations 5-1 to 5-4 preferentially select an RF that is used only by a femtocell(s). As a result, the degradation in the link quality of a number of mobile stations, for which the connection to the femtocells 8-1 to 8-4 is restricted and which therefore connect to the macrocell 6 or the microcell 7, can be suppressed.

Fourth Exemplary Embodiment

In the above-described first to third exemplary embodiments, examples in which the femto base stations 5-1 to 5-4 each including the mobile-station mode receiving unit 55 measure the reception level of a pilot signal transmitted from other base stations, receive cell selection information, and select an RF by using the measurement result and the cell selection information are explained. However, the mobile stations 9-1 to 9-3 may perform at least one of the measurement of the reception level of a pilot signal and the reception of cell selection information reported by a base station, and then the femto base stations 5-1 to 5-4 may receive the measurement result or the reception result from mobile stations to select an RF.

Figure 10:
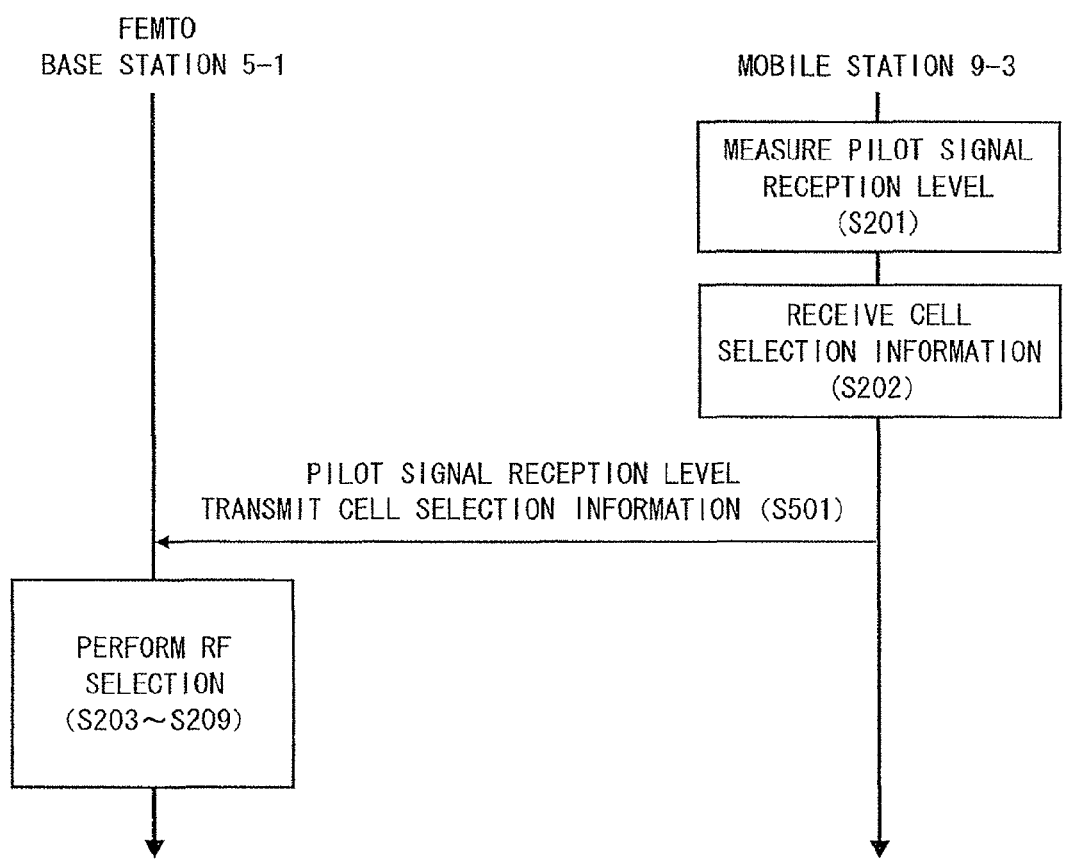
FIG. 10 shows procedure for selecting a radio frequency in accordance with a fourth exemplary embodiment of the present invention.

As an example, a case where the mobile station 9-3 performs the measurement of the reception level of a pilot signal and the reception of cell selection information reported by a base station and the femto base station 5-1 selects a cell by using the information received from the mobile station 9-3 is explained. FIG. 10 is a timing chart with regard to this exemplary embodiment. As shown in FIG. 10, the mobile station 9-3 first measures the reception levels of the pilot signals of cells using respective RFs. This process corresponds to the step S201 of FIG. 7. Next, the mobile station 9-3 receives the cell selection information of a cell(s) for which the reception level of a pilot signal is equal to or greater than a predefined value $PB_{TH}$. This process corresponds to the step S202 of FIG. 7. Next, the mobile station 9-3 transmits the measurement result of the reception level of the pilot signal and the received cell selection information to the femto base station 5-1 (step S501). After that, the femto base station 5-1 selects an RF by using the reception level of the pilot signal and the cell selection information received from the mobile station 9-3. This process corresponds to the steps S203 to S209 of FIG. 7.

Figure 11:
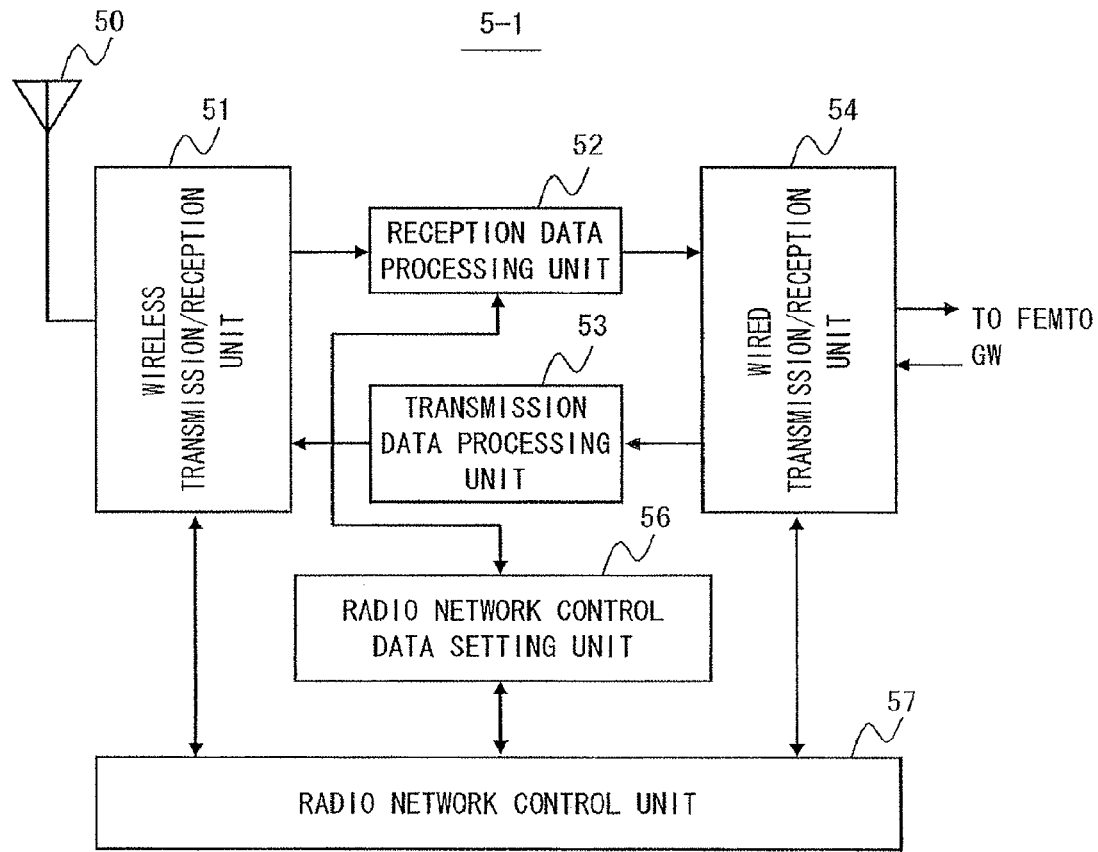
FIG. 11 shows a configuration of a femto base station in accordance with a fourth exemplary embodiment of the present invention.

FIG. 11 shows an example of a configuration of a femto base station 5-1 in accordance with this exemplary embodiment. In this exemplary embodiment, since the femto base station 5-1 does not need to operate in a mobile-station mode, the mobile-station mode receiving unit 55 is removed from the configuration. Note that the radio network control data setting unit 56 of FIG. 11 acquires the reception level of a pilot signal and cell selection information received from the mobile station 9-3 by accessing the reception data processing unit 52, and selects an RF by using them.

Alternatively, the mobile stations 9-1 to 9-3 may perform the operations up to the selection of an RF and notify the selected RF to the femto base stations 5-1 to 5-4, and then the femto base stations 5-1 to 5-4 may use the RF selected by the mobile stations.

By using hardware resources possessed by the mobile stations 9-1 to 9-3 for the RF selection by the femto base stations 5-1 to 5-4 like this exemplary embodiment, the function of the mobile-station mode receiving unit 55 provided in the femto base stations 5-1 to 5-4 can be simplified or removed.

Fifth Exemplary Embodiment

In the above-described first to third exemplary embodiments, the femto base stations 5-1 to 5-4 perform radio resource management by selecting an RF used to be used in the femtocells 8-1 to 8-3 so that the conflict of an RF used by adjacent mobile station(s) is avoided. However, the selection of an RF is merely a representative example of the radio resource management performed by the femto base stations 5-1 to 5-4. In this exemplary embodiment, as another example of the radio resource management performed by the femto base stations 5-1 to 5-4, an example in which radio resource management is performed by increasing/decreasing the predetermined transmission power of the RF of a femtocell is shown. The femto base stations 5-1 to 5-4 in accordance with this exemplary embodiment may have a similar configuration to that of the first exemplary embodiment. A transmission power control operation performed by the femto base stations 5-1 to 5-4 is explained hereinafter with reference to FIG. 12. The flowchart shown in FIG. 12 is different from that of FIG. 7 in that steps S210 to S213 are added.

Figure 12:
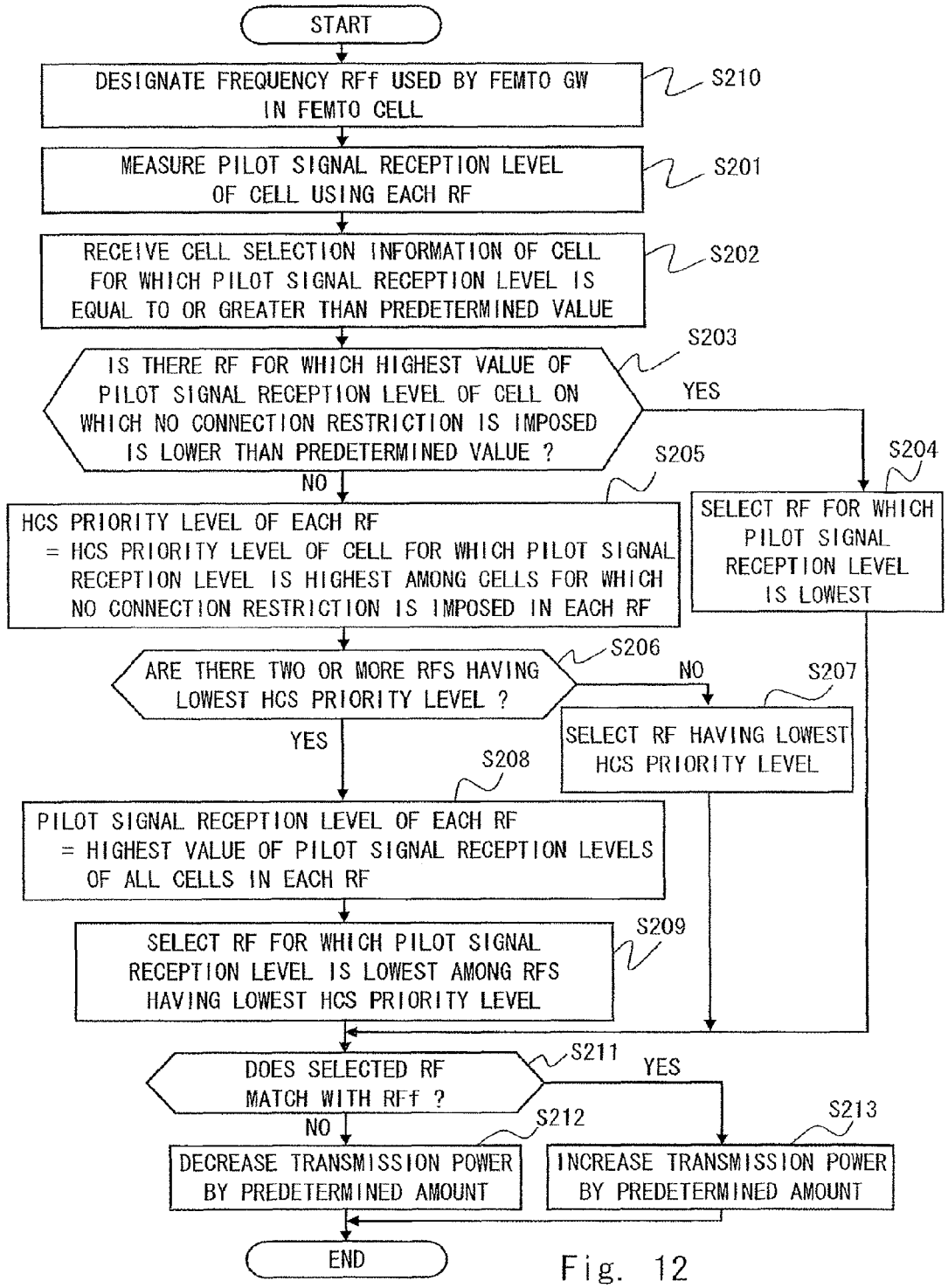
FIG. 12 shows procedure for controlling a transmission power performed by a femto base station in accordance with a fifth exemplary embodiment of the present invention.

In FIG. 12, firstly, a radio frequency RFf to be used in femtocells is designated by the femto gateway apparatus 2 for the femto base stations 5-1 to 5-4 (step S210). In the configuration shown in FIG. 1, for example, one of RF1, RF2 and RF3 is designated for the femto base stations 5-1 to 5-4. Since the femto gateway apparatus 2 in this exemplary embodiment is equipped with an RNC (Radio Network Controller), it can notify the femto base stations 5-1 to 5-4 of a predetermined RF for the femtocells.

The process that is carried out to select an RF available for a femtocell so that the interference with a transmission signal on the uplink and the downlink of a macro base station and/or a micro base station is avoided is performed in the steps S201 to S209. The processes in these steps are similar to those of FIG. 7, and therefore their explanation is omitted.

Next, the femto base stations 5-1 to 5-4 determine whether or not the RF available for the femtocell (hereinafter called "selected RF"), which is selected in the steps S201 to S209, matches with the RFf designated by the femto gateway apparatus 2 (hereinafter called "designated RF") (step S211). Note that the femto base stations 5-1 to 5-4 use the RFf, i.e., designated RF regardless of the determination result made in the step S211. However, if the selected RF matches with the designated RF in the decision in the step S211, the interference with other cells (e.g., macrocell 6 or microcell 7) to which adjacent mobile stations connect can be avoided even if the femto base stations 5-1 to 5-4 use RFf. Therefore, the femto base stations 5-1 to 5-4 increase the transmission power of a signal to be transmitted at RFf by a predetermined amount (step S213). On the other hand, if the selected RF does not match with the designated RF in the decision in the step S211, the possibility of the interference with the macrocell 6 or the microcell 7 is high when the femto base stations 5-1 to 5-4 use RFf. Therefore, the femto base stations 5-1 to 5-4 decrease the transmission power of a signal to be transmitted at RFf by a predetermined amount (step S212).

The increase/decrease of a transmission power in the femto base stations 5-1 to 5-4 is explained with reference to FIG. 1. The selected RF is RF2 in the femto base station 5-1. Therefore, the femto base station 5-1 increases the transmission power by a predetermined amount (e.g., 1 dB) when the designated RF is RF2, whereas it decreases the transmission power by a predetermined amount (e.g., 1 dB) when the designated RF is not RF2. Similarly, the selected RF is RF1 in the femto base station 5-2. Therefore, the femto base station 5-2 increases the transmission power by a predetermined amount (e.g., 1 dB) when the designated RF is RF1, whereas it decreases the transmission power by a predetermined amount (e.g., 1 dB) when the designated RF is not RF1. The selected RF is RF3 in the femto base stations 5-3 and 5-4. Therefore, they increase the transmission power by a predetermined amount when the designated RF is RF3, whereas they decrease the transmission power by a predetermined amount when the designated RF is not RF3. However, if there is a high possibility that femtocells using the same RF are located close to one another as in the case of the femto base stations 5-3 and 5-4, the amount of increase to be added to the transmission power when the selected RF matches with the designated RF may be set to zero.

Sixth Exemplary Embodiment

In the above-described first, second, fourth, and fifth exemplary embodiments, examples in which the macro base station 3 or the macro base station 3 and the micro base station 4 transmits an HCS priority level are explained. However, the cell attribute information that can be used for the selection of a destination cell made by the mobile stations 9-1 to 9-3 and the selection of an RF made by the femto base stations 5-1 to 5-4 is not limited to the HCS priority level. In this exemplary embodiment, an example in which a macro base station transmits the transmission power value of a pilot signal as a substitute for the HCS priority level is explained. Further, the mobile stations 9-1 to 9-3 do not preferentially select a cell having a high HCS priority level, but do preferentially select a cell for which the transmission power value of a pilot signal is small. Further, the femto base stations 5-1 to 5-4 do not preferentially select an RF used by a cell having a low HCS priority level, but do preferentially select an RF used by a cell for which the transmission power value of a pilot signal is large. For example, the upper limit value of the transmission power value of a pilot signal may be set to 2 W in the macrocell 6, 0.2 W in the microcell 7, and 0.01 W in the femtocells 8-1 to 8-3. Except that the transmission power value of a pilot signal is used instead of the HCS priority level, this exemplary embodiment is the same as the first, second and fourth exemplary embodiments.

In this way, the transmission power value of a pilot signal becomes smaller in the order of the macrocell 6, the microcell 7, and the femtocells 8-1 to 8-3 (note that the order among the femtocells is not specified). Further, since the HCS priority level in the first, second and fourth exemplary embodiments becomes higher in the same order shown above, the operations of the sixth exemplary embodiment becomes the same as those of the first, second and fourth exemplary embodiments by substituting the transmission power value of a pilot signal for the HCS priority level as described above. That is, for example, the mobile station 9-2 that is located near the femto base station 5-1 but communicate with the macro base station 3 or the micro base station 4 connects to a cell for which the transmission power value of a pilot signal is smaller, i.e., the microcell 7, and uses RF3. Meanwhile, the femto base station 5-1 connects to a cell for which the transmission power value of a pilot signal is larger, i.e., the macrocell 6, and uses RF1. Therefore, the mobile station 9-2 and the femto base station 5-1 use different RFs from each other, and thereby can avoid the interference with each other.

Seventh Exemplary Embodiment

Although a WCDMA mode is adopted as a communication mode between a base station and a mobile station in the first to sixth exemplary embodiments, a single carrier FDMA (Frequency Division Multiple Access) mode and an OFDM (Orthogonal Frequency Division Multiplexing) mode are adopted on the uplink and the downlink respectively in this exemplary embodiment. Further, each radio frequency band is divided into a plurality of PRBs (Physical Resource Blocks), and a scheduler provided in a base station performs the assignment of the PRBs. Further, the base station performs data communication with a mobile station by using an assigned PRB.

Although the macro/micro gateway apparatus 1 in accordance with the first exemplary embodiment, for example, is equipped with the RNC (Radio Network Controller) function, the macro/micro gateway apparatus 1 in accordance with this exemplary embodiment does not have the RNC function. Instead, the macro base station 3 and the micro base station 4 are equipped with the RNC function.

Figure 13:
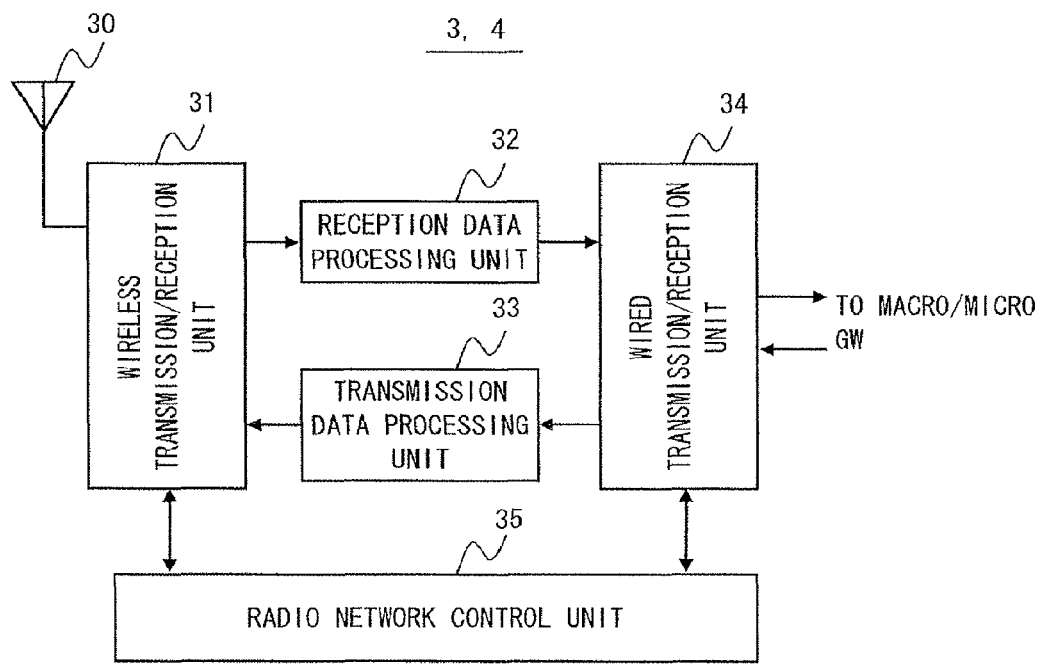
FIG. 13 shows a configuration of a macro base station and a micro base station in accordance with a seventh exemplary embodiment of the present invention.
Figure 14:
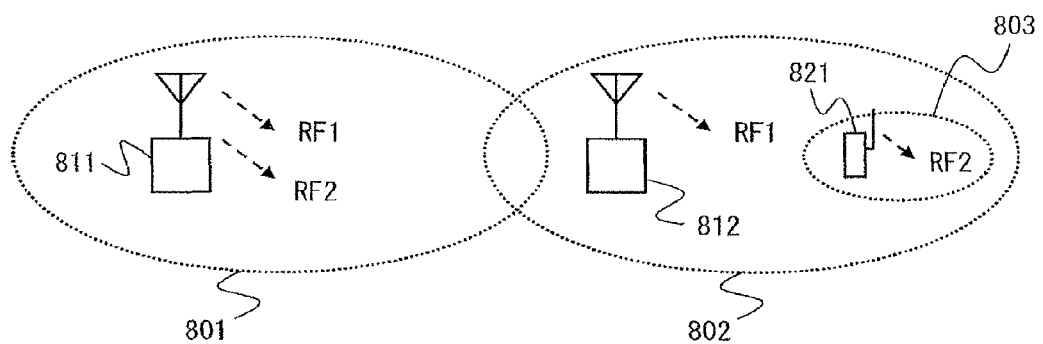
FIG. 14 is a diagram for explaining a selection method of a radio frequency in related art.
Figure 15:
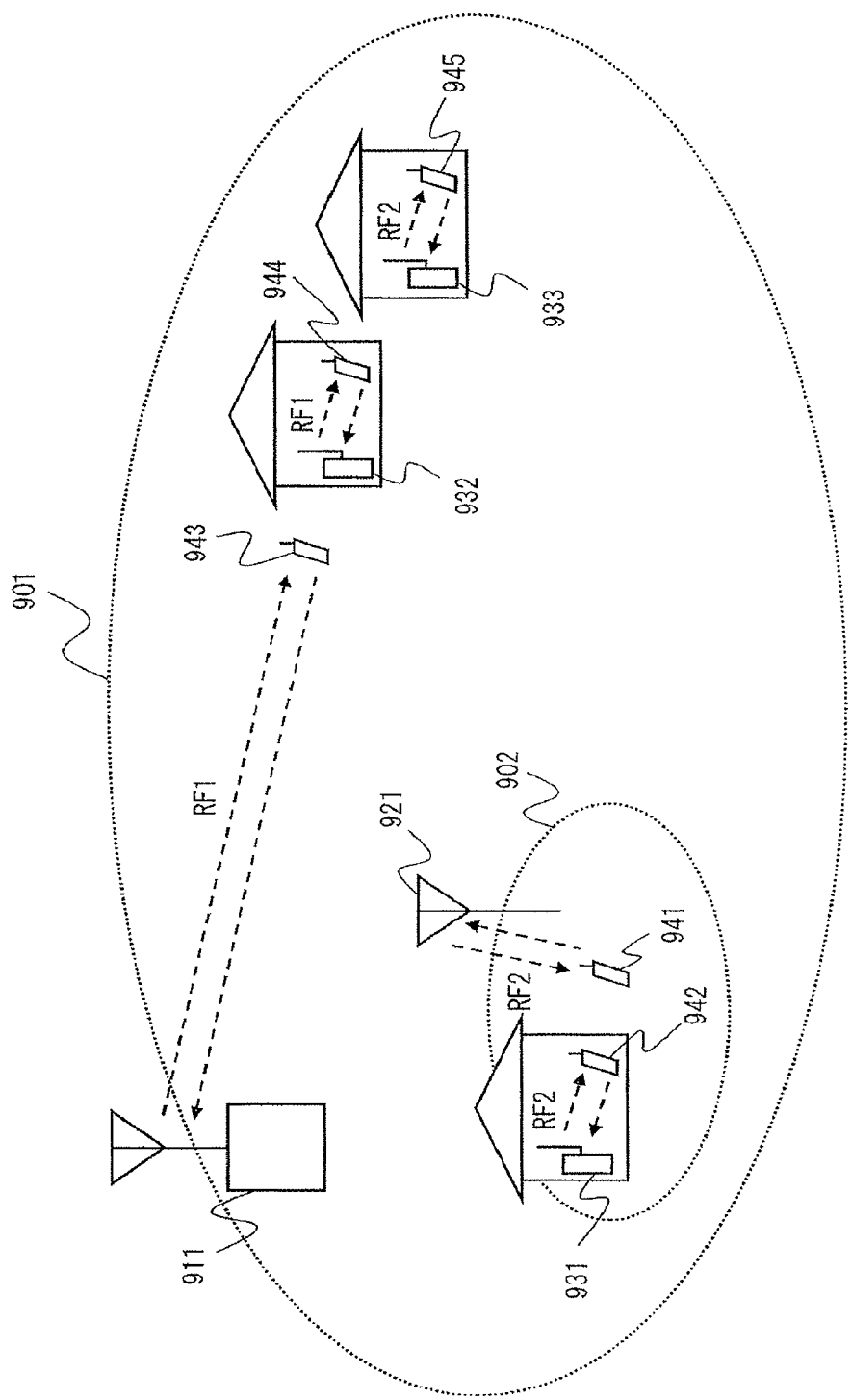
FIG. 15 is a diagram for explaining an analysis with regard to the selection of a radio frequency in a femtocell.

FIG. 13 shows an example of a configuration of a macro base station 3 and a micro base station 4 in accordance with this exemplary embodiment. Referring to FIG. 13, the macro base station 3 and the micro base station 4 in accordance with this exemplary embodiment includes a radio network control unit 35. The radio network control unit 35 retains control parameters to be used in each cell, such as a frequency channel and a transmission power value of a pilot signal, and notifies these parameters to the wireless transmission/reception unit 31. The wireless control unit 31 in FIG. 13 uses the control parameters, which are not notified from the macro/micro gateway apparatus 1 but are notified from the radio network control unit 35, to perform wireless communication with a mobile station. Note that the other components in FIG. 13 are similar to those of the macro base station 3 and the micro base station 4 in accordance with the first exemplary embodiment explained with reference to FIG. 3 except the modulation mode used in the wireless receiving unit 31. Further, the radio resource selecting procedure performed by the femto base stations 5-1 to 5-4 and the cell selecting procedure performed by the mobile stations 9-1 to 9-3 in accordance with this exemplary embodiment may be the same as those in either one of the above-described first and fifth exemplary embodiments.

Other Exemplary Embodiments

Additional embodiments modified from the above-described first to seventh exemplary embodiments are listed hereinafter. In the first to seventh exemplary embodiments, examples in which the femto base stations 5-1 to 5-4 performs radio resource management such as selection of an RF or control of a transmission power by using cell selection information that is used by a mobile station to select a cell are shown. However, the cell selection information is merely an example of "cell attribute information indicating a cell attribute" that is used by the femto base stations 5-1 to 5-4 for the radio resource management. For example, the femto base stations 5-1 to 5-4 may select an RF by using other information transmitted from the macro base station 3 or the like separately from the cell selection information used by a mobile station for the cell selection.

Further, in the first to seventh exemplary embodiments, examples in which the femto base stations 5-1 to 5-4 select an RF or a physical resource block (PRB) are shown. However, needless to say, the radio resource selected by the femto base stations 5-1 to 5-4 is not limited to the RF and the physical resource block (PRB). For example, the radio resource selected by the femto base stations 5-1 to 5-4 may be a scrambling code or the combination of an RF and a scrambling code.

Further, in the first to seventh exemplary embodiments, examples in which the femto base stations 5-1 to 5-4 perform radio resource management such as selection of an RF or control of a transmission power by using the measurement result of the reception level of a pilot signal are shown. However, the reception level of a pilot signal is merely an example of parameters indicating the reception quality of a signal transmitted wirelessly from other base stations. For example, the femto base stations 5-1 to 5-4 may use other parameters such as the reception SIR (Signal to Interference Ratio) of a pilot signal and the BER (Bit Error Rate) of a downlink signal instead of or in addition to the reception level of a pilot signal. Similarly, the mobile stations 9-1 to 9-3 may also use parameters such as the reception SIR (Signal to Interference Ratio) of a pilot signal and the BER (Bit Error Rate) of a downlink signal, instead of or in addition to the reception level of a pilot signal, to select a cell.

Further, the radio resource management performed by the femto base stations 5-1 to 5-4, such as selection of an RF or control of a transmission power, described in the first to seventh exemplary embodiments can be implemented by executing a program for base-station control in a computer such as a microprocessor. In the case of the first exemplary embodiment, for example, the measurement of the reception level of a pilot signal and the reception of cell selection information may be carried out by the mobile-station mode receiving unit 55 based on the control of a computer executing a base-station control program. Then, the RF selecting process may be carried out by using the obtained measurement result of the reception level of a pilot signal and the cell selection information. Further, after the selected RF is set in the wireless transmission/reception unit 51, the communication with a mobile station may be performed.

Further, the cell selecting process performed by the mobile stations 9-1 to 9-4 described in the first to seventh exemplary embodiments can be also implemented by executing a program for mobile-station control in a computer. Similarly, the measurement of the reception level of a pilot signal and the reception of cell selection information performed by the mobile stations 9-1 to 9-4 for the radio resource management performed by the femto base station, which are described in the fourth exemplary embodiment, may be also implemented by causing the wireless transmission/reception unit 91, cell selection control unit 95, and the like to operate based on instructions of a computer executing a mobile-station control program.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2007-257709, filed on Oct. 1, 2007, the disclosure of which is incorporated herein in its entirety by reference.

INDUSTRIAL APPLICABILITY

The present invention may be applied to a wireless communication system, in particular a system in which at least one of base stations autonomously performs radio resource management (e.g., selects a radio frequency used for communication from a plurality of radio frequencies), a wireless communication method, a base station and a mobile station, a base station and mobile station control method, and a base station and mobile station control program.

The invention claimed is:

1. A base station comprising:
a receiver configured to receive information indicating cell types of neighboring base stations;
a measurement unit configured to measure received signal strengths from the neighboring base stations; and
a frequency selector configured to select a frequency bandwidth for communication by using both of the cell types and the measured signal strengths, wherein
the frequency selector is configured to compare base stations which provide highest signal strengths for respective frequency bandwidths and selects the frequency bandwidth used by a base station corresponding to a cell type which has a lowest priority among the compared base stations, in a case where at least a base station, which provides a signal strength higher than a threshold value, exists in each of the frequency bandwidths.

2. A mobile station comprising:
a receiver configured to receive, from at least one of base stations, information indicating cell types of the base stations, the information being transmitted wirelessly from the at least one of the base stations;
a measurement unit configured to measure signal strengths from the base stations; and
a cell selector configured to select a base station for communication by using both of the cell types and the measured signal strengths, wherein
the cell selector is configured to select the base station which satisfies conditions of (1) a signal strength from the base station being higher than a threshold value and (2) the base station corresponding to a cell type having a higher priority than cell types of other base stations which satisfy condition (1).

3. A method performed by a base station, the method comprising:
receiving, from at least one of neighboring base stations, information indicating cell types of the neighboring base stations, the information being transmitted wirelessly from the at least one of the neighboring base stations;
measuring received signal strengths from the neighboring base stations; and
selecting a frequency bandwidth for communication by using both of the cell types and the measured signal strengths, wherein
the selecting comprises
comparing base stations which provide highest signal strengths for respective frequency bandwidths, and
selecting the frequency bandwidth used by a base station corresponding to a cell type which has a lowest priority among the compared base stations, in a case where at least a base station, which provides a signal strength higher than a threshold value, exists in each of the frequency bandwidths.

4. A method performed by a mobile station, the method comprising:
receiving, from at least one of base stations, information indicating cell types of the base stations, the information being transmitted wirelessly from the at least one of the base stations;
measuring signal strengths from the base stations; and
selecting a base station for communication by using both of the cell types and the measured signal strengths, wherein
the selecting comprises selecting the base station which satisfies conditions of (1) a signal strength from the base station being higher than a threshold value and (2) the base station corresponding to a cell type having a higher priority than cell types of other base stations which satisfy condition (1).

* * * * *

UNITED STATES PATENT AND TRADEMARK OFFICE
CERTIFICATE OF CORRECTION

PATENT NO. : 9,942,882 B2
APPLICATION NO. : 14/230579
DATED : April 10, 2018
INVENTOR(S) : Kojiro Hamabe and Motoki Morita It is certified that error appears in the above-identified patent and that said Letters Patent is hereby corrected as shown below:

In the Claims

Column 23, Line 13; In Claim 1, after "receive", insert --, from at least one of neighboring base stations,--

Column 23, Line 14; In Claim 1, after "of", insert --the neighboring base stations, the information being transmitted wirelessly from the at least one of the--

Signed and Sealed this
Twenty-ninth Day of January, 2019

Andrei Iancu
*Director of the United States Patent and Trademark Office*